(12) United States Patent
Park et al.

(10) Patent No.: US 8,174,848 B2
(45) Date of Patent: May 8, 2012

(54) REINFORCEMENT FRAME FOR A DISPLAY PANEL USING EXTRUDED ALUMINUM ALLOY AND APPARATUS AND METHOD FOR MANUFACTURING THE SAME

(75) Inventors: Do-Bong Park, Gyeonggi-do (KR); Sang-Woo Park, Daejeon (KR); Kae-Hee Oh, Daejeon (KR); Jin-Woo Park, Daejeon (KR)

(73) Assignee: Dongyang Gangchul., Ltd., Daejon (KR)

( * ) Notice: Subject to any disclaimer, the term of this patent is extended or adjusted under 35 U.S.C. 154(b) by 454 days.

(21) Appl. No.: 12/447,112

(22) PCT Filed: Nov. 2, 2007

(86) PCT No.: PCT/KR2007/005514
§ 371 (c)(1),
(2), (4) Date: Apr. 24, 2009

(87) PCT Pub. No.: WO2008/054167
PCT Pub. Date: May 8, 2008

(65) Prior Publication Data
US 2010/0039788 A1 Feb. 18, 2010

(30) Foreign Application Priority Data

Nov. 3, 2006 (KR) .................. 10-2006-0108453
Oct. 16, 2007 (KR) .................. 10-2007-0103835

(51) Int. Cl.
*H02B 1/01* (2006.01)

(52) U.S. Cl. .................. 361/829; 296/203.01; 296/1.01
(58) Field of Classification Search .................. 361/807, 361/810, 829; 52/653.1, 745.13; 296/203.01; 293/155
See application file for complete search history.

(56) References Cited

U.S. PATENT DOCUMENTS

| 5,979,742 | A | 11/1999 | Enomoto et al. | |
| 6,050,474 | A | 4/2000 | Aota et al. | |
| 6,733,900 | B2 * | 5/2004 | Satou et al. | 428/615 |
| 2002/0135294 | A1 | 9/2002 | Fujishiro et al. | |
| 2005/0168954 | A1 | 8/2005 | Kim | |
| 2010/0037997 | A1 * | 2/2010 | Cooper et al. | 148/688 |

FOREIGN PATENT DOCUMENTS

| EP | 1222991 | 7/2002 |
| JP | 2000039850 | 2/2000 |
| JP | 2000258754 | 9/2000 |
| JP | 2003304077 | 10/2003 |
| KR | 20060080754 | 6/2006 |
| WO | WO9526254 | 10/1995 |

* cited by examiner

*Primary Examiner* — Hung S Bui
(74) *Attorney, Agent, or Firm* — DeLio & Peterson, LLC; Thomas E. Ciesco

(57) ABSTRACT

Disclosed is a reinforcement frame for a display panel using aluminum alloy extrusion members and an apparatus and a method for manufacturing the same, wherein, while a number of unitary aluminum alloy extrusion members abut one another, a welding head is used to cause the abutting portions to undergo friction resulting from high-speed rotation so that the members are melted and welded to one another by the resulting frictional heat.

9 Claims, 20 Drawing Sheets

(1a)

(1b)

[Fig. 1]
(1a)
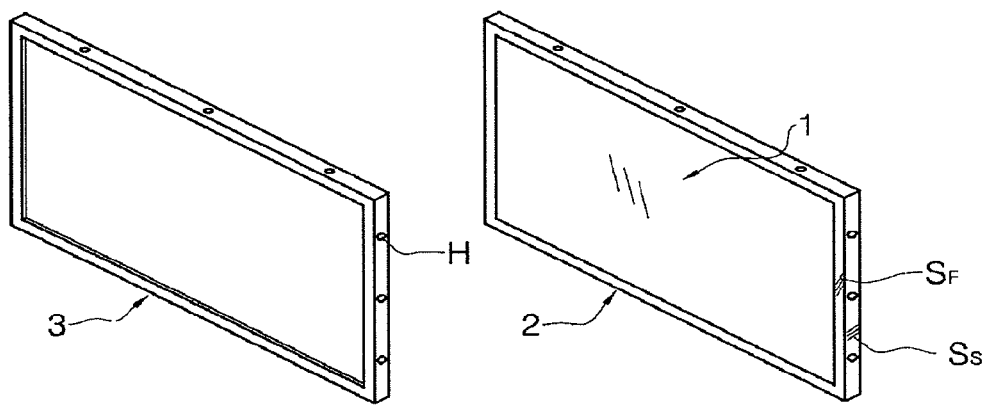
(1b)
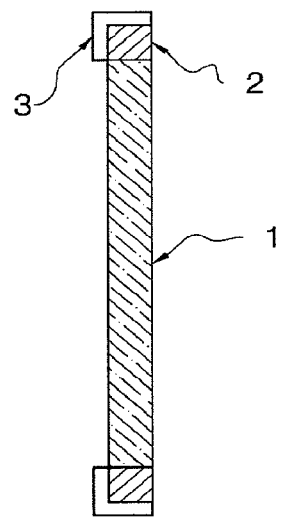

[Fig. 2]
(2a)
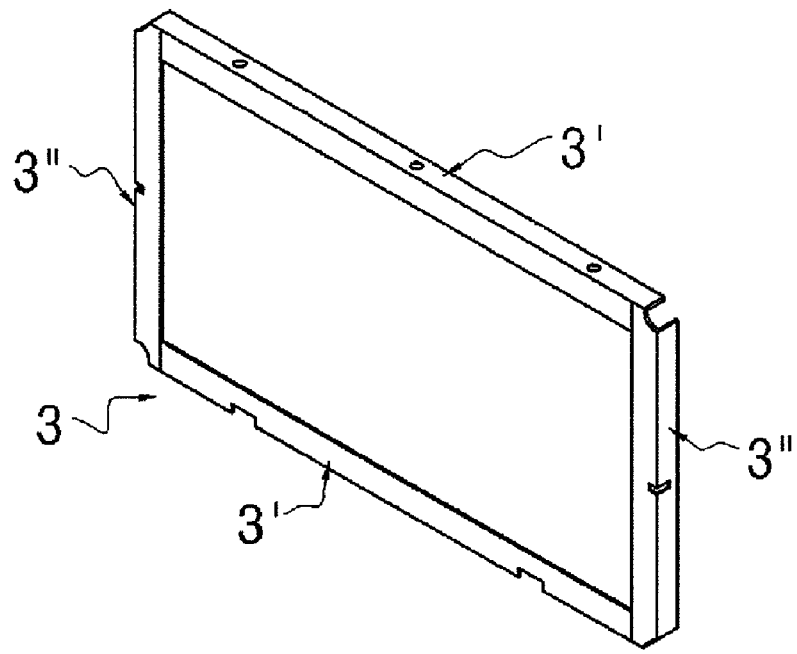
(2b)
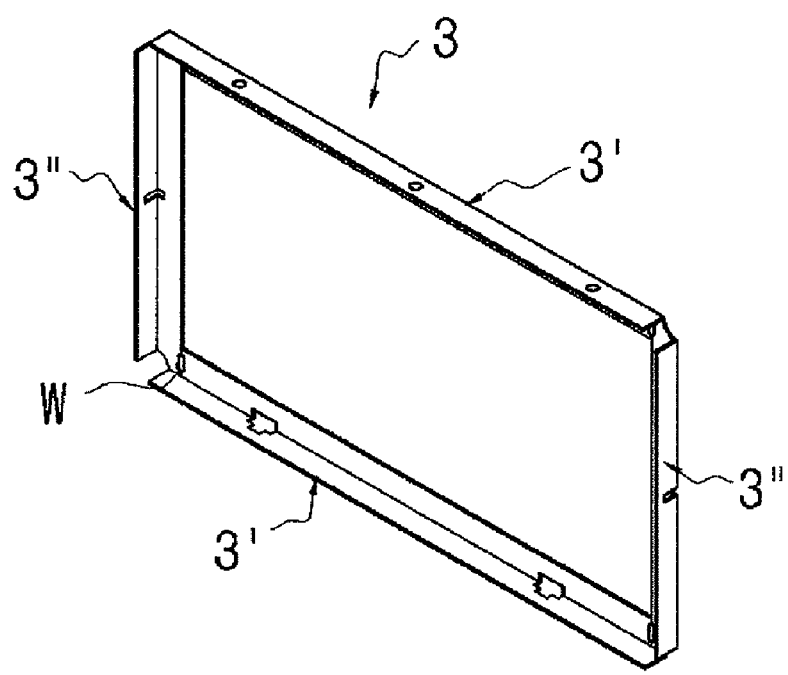

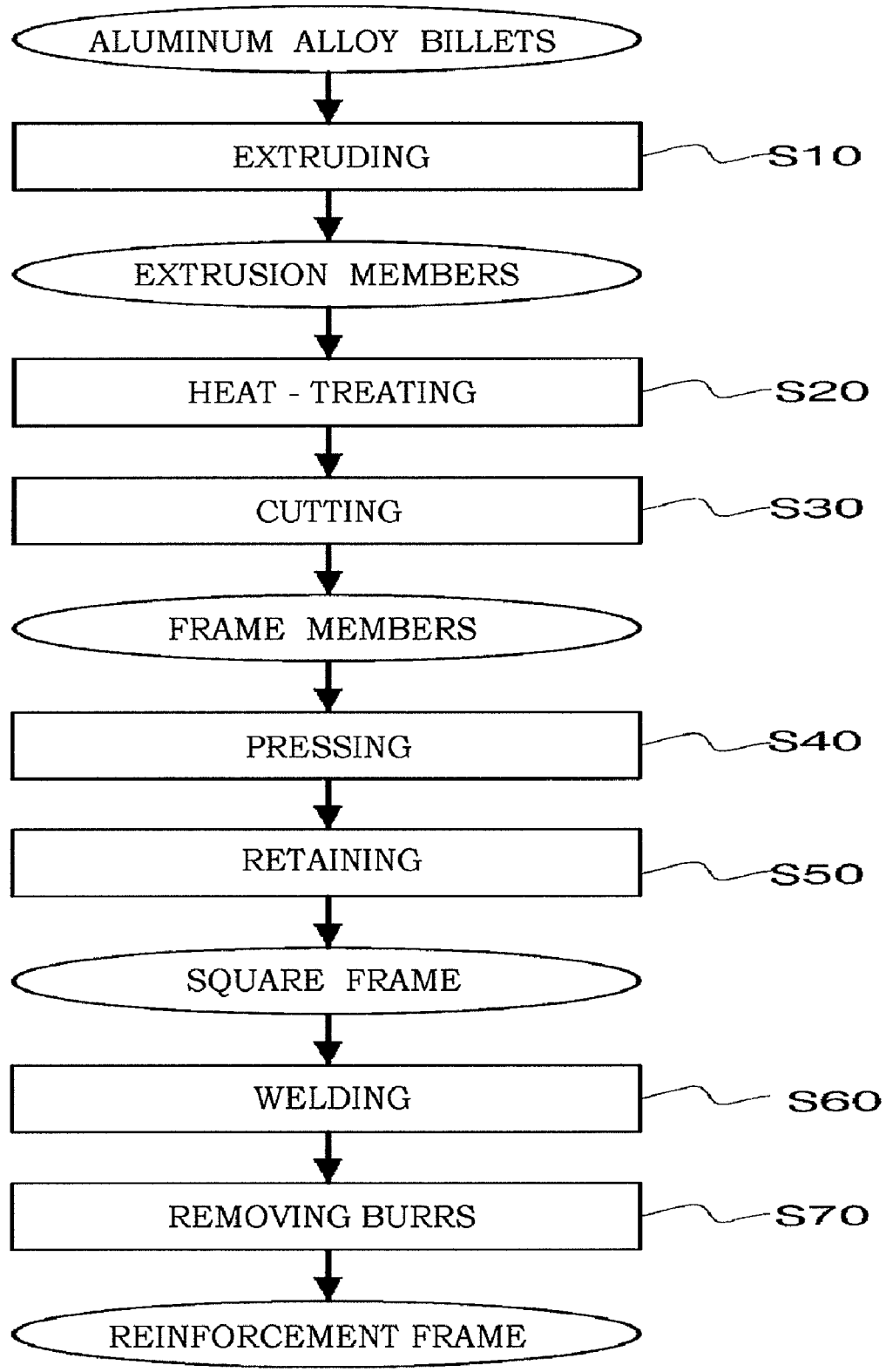
[Fig. 3]

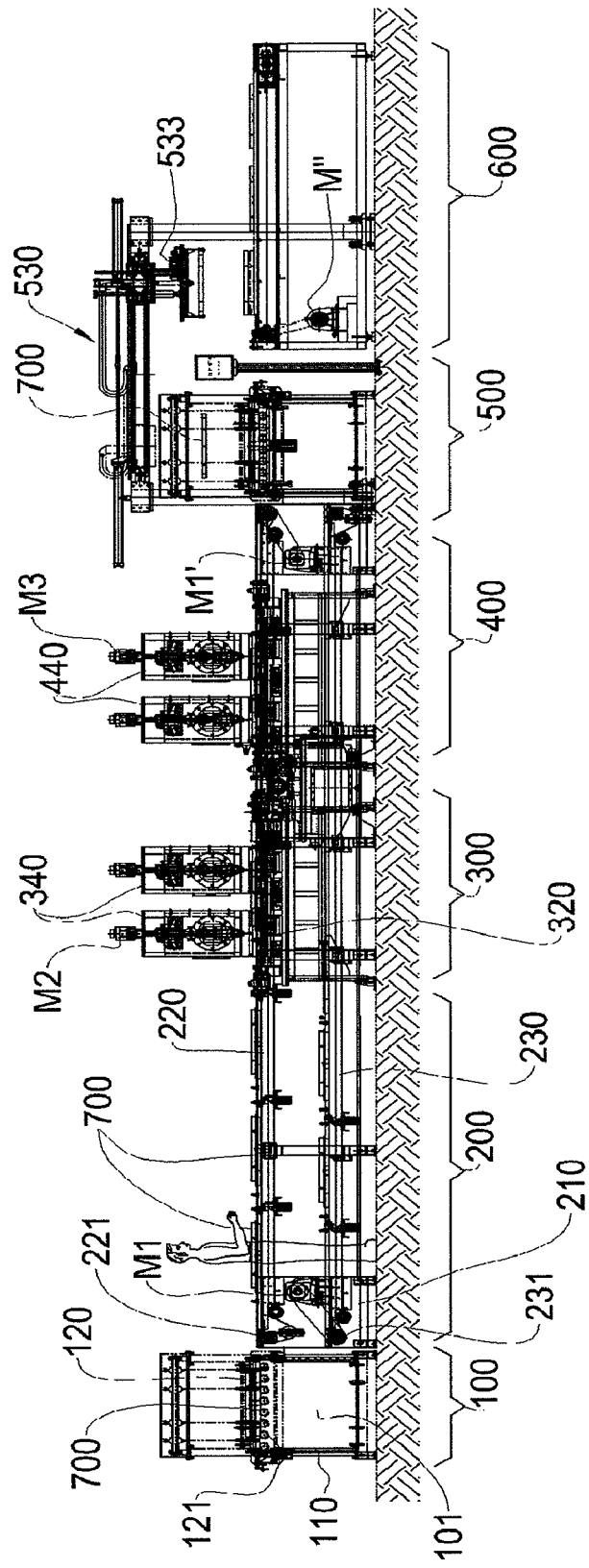
[Fig. 4]

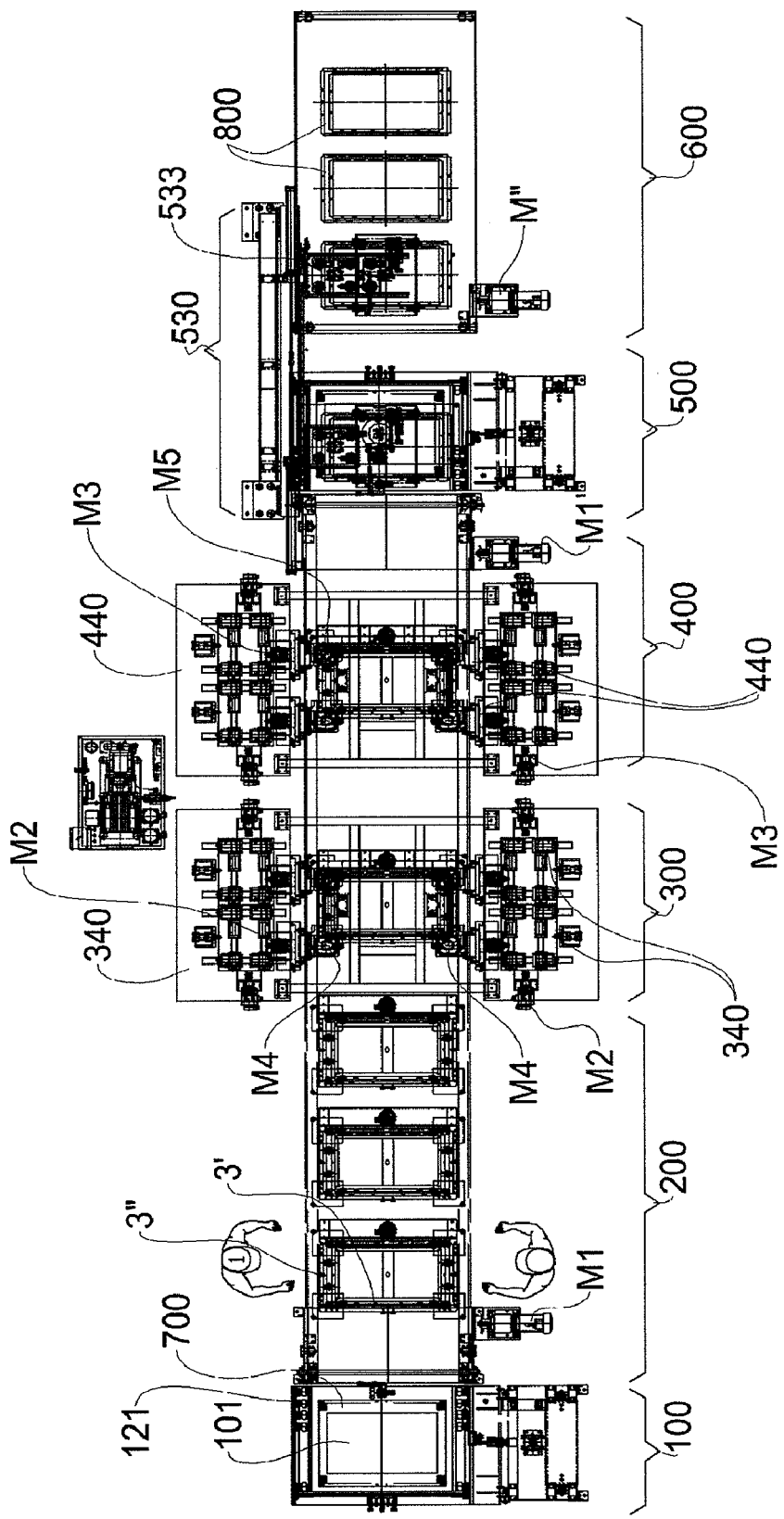

[Fig. 6]
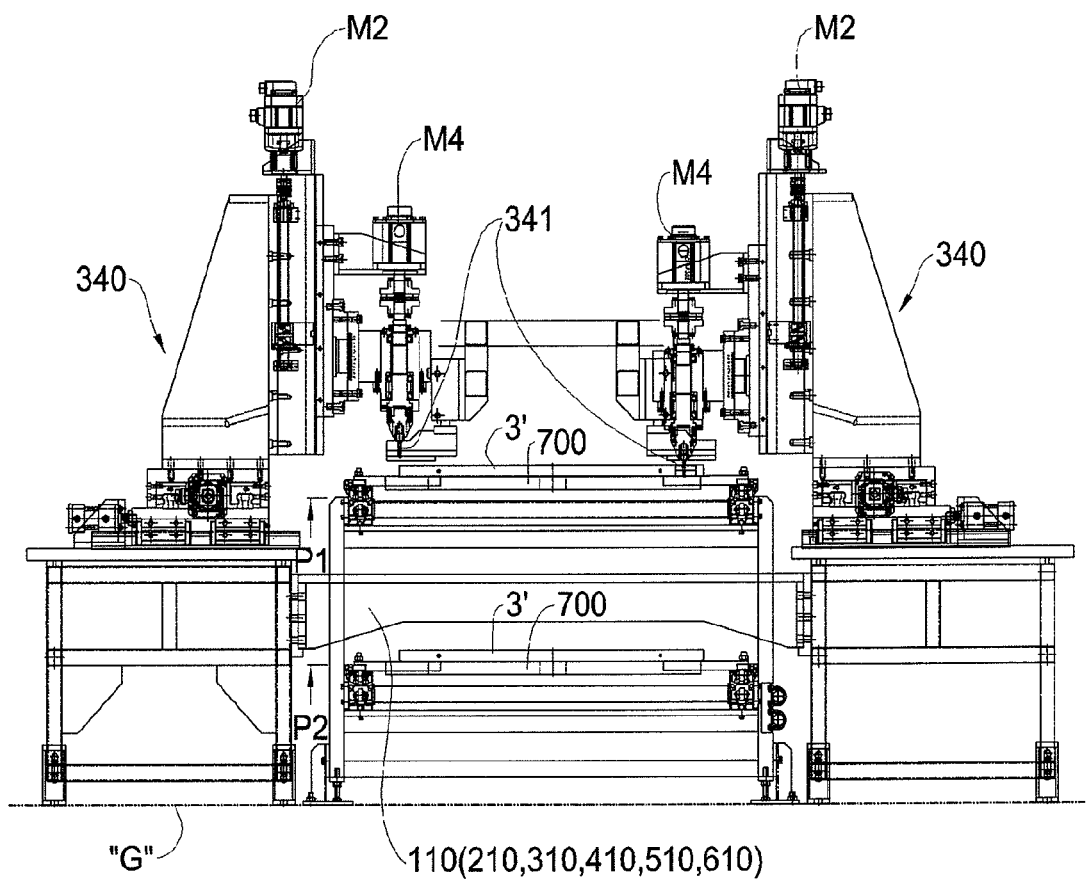

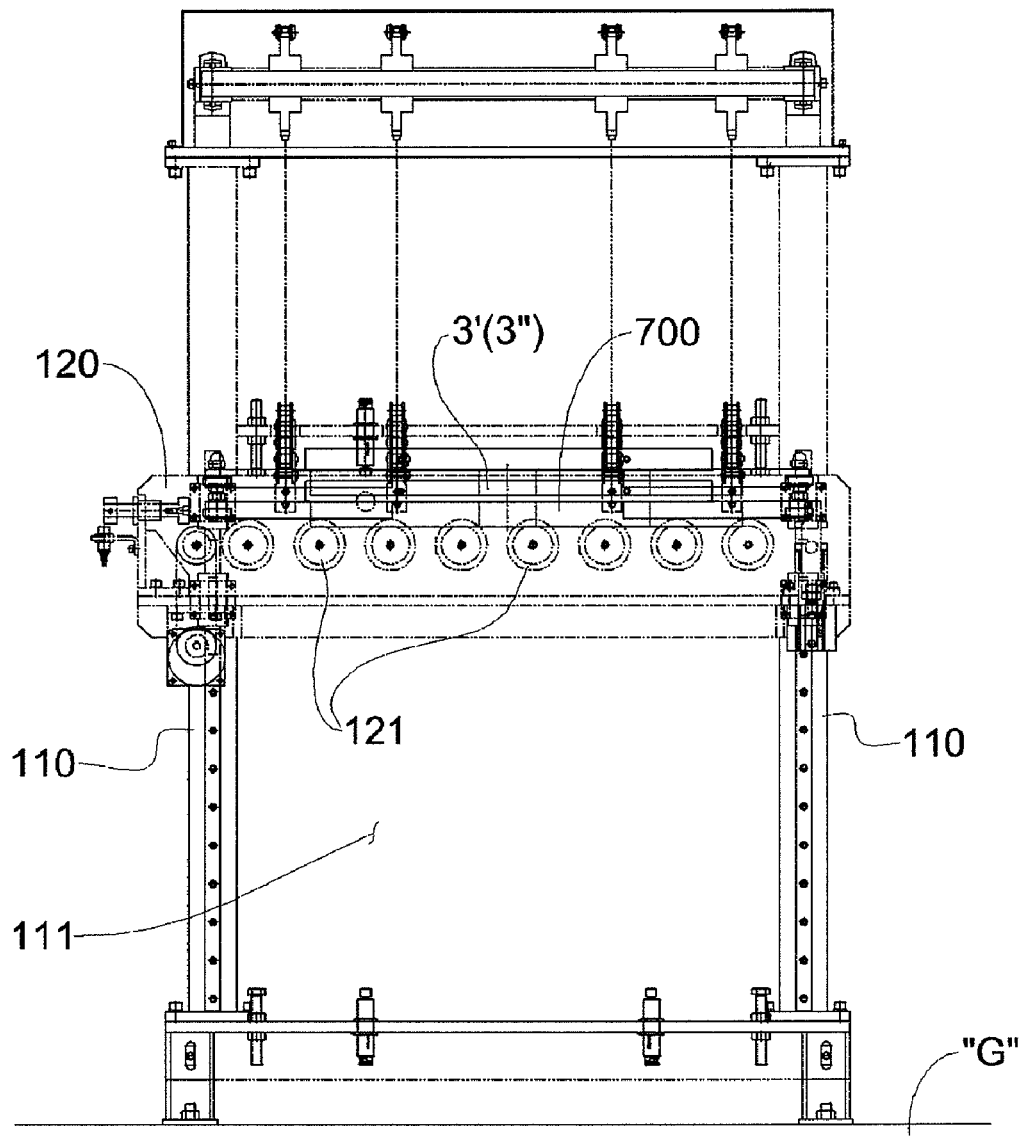
[Fig. 7]

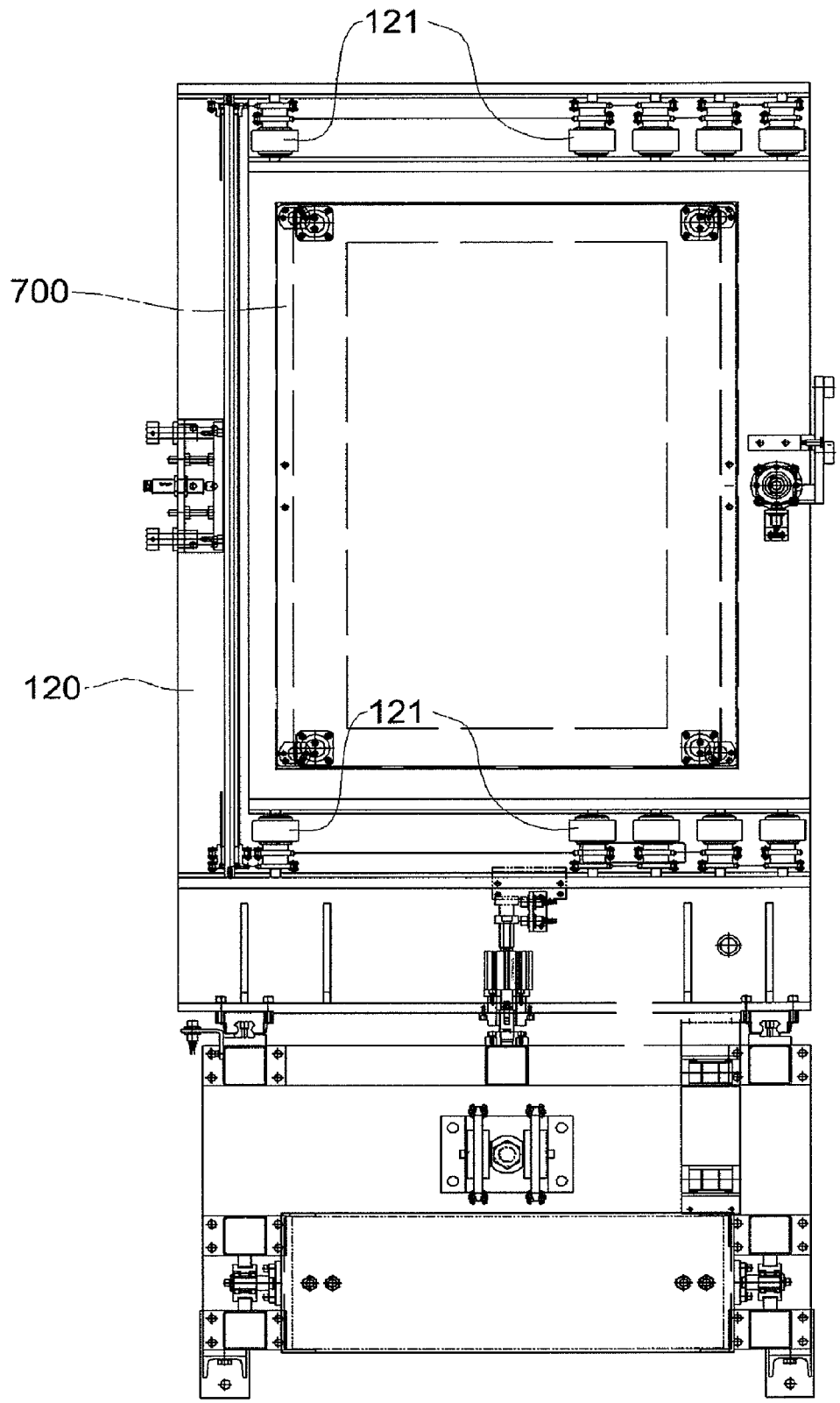
[Fig. 8]

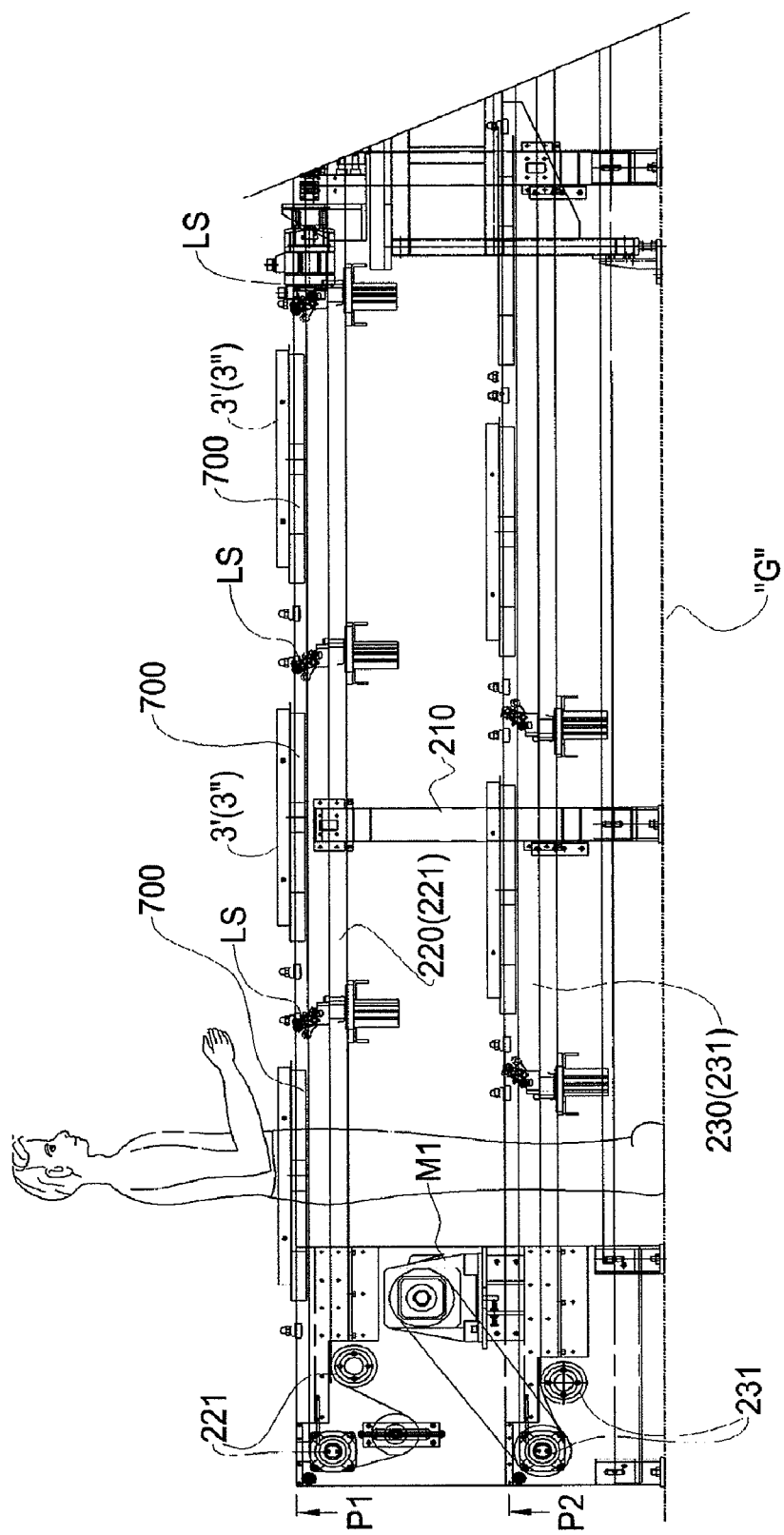
[Fig. 9]

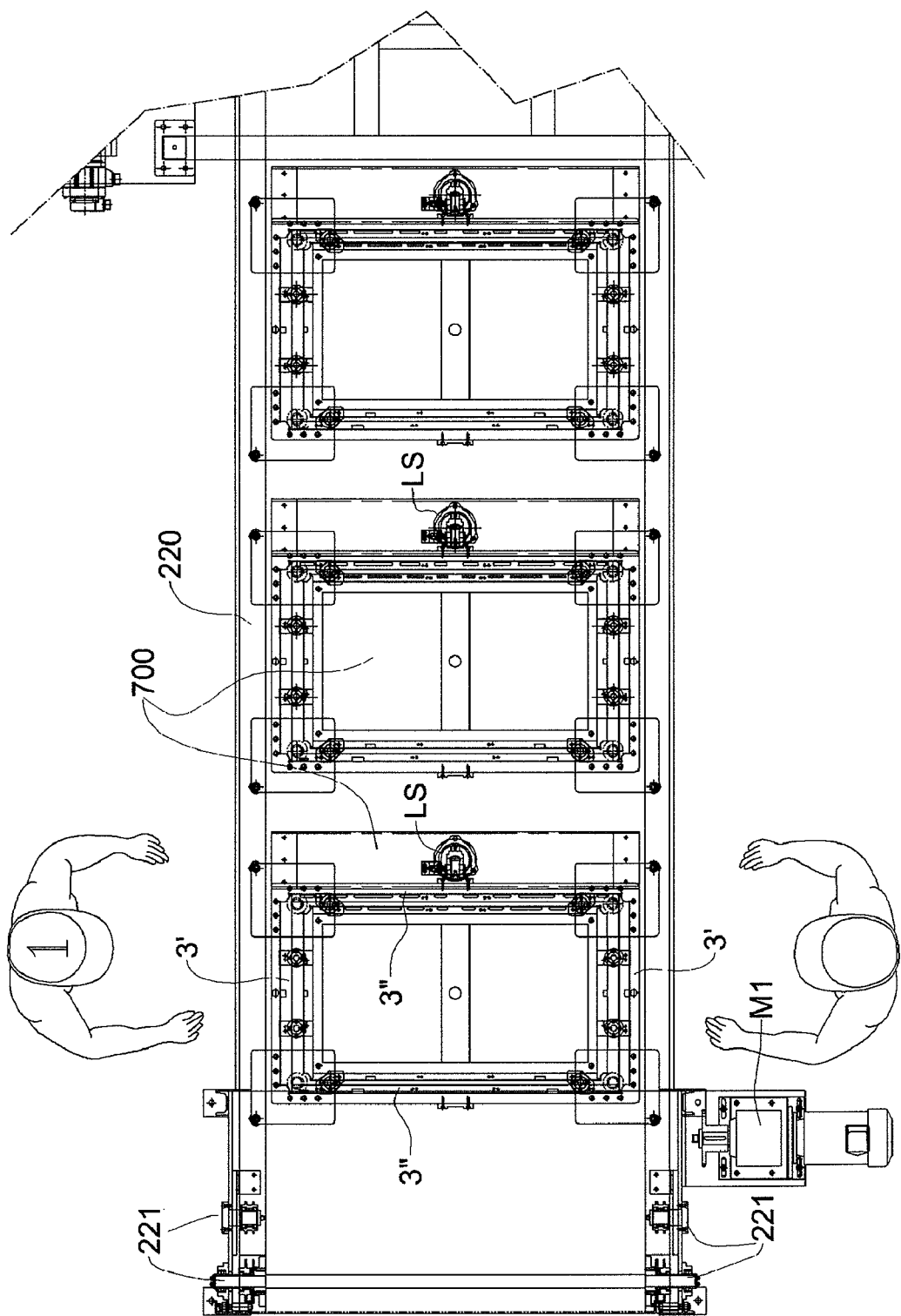
[Fig. 10]

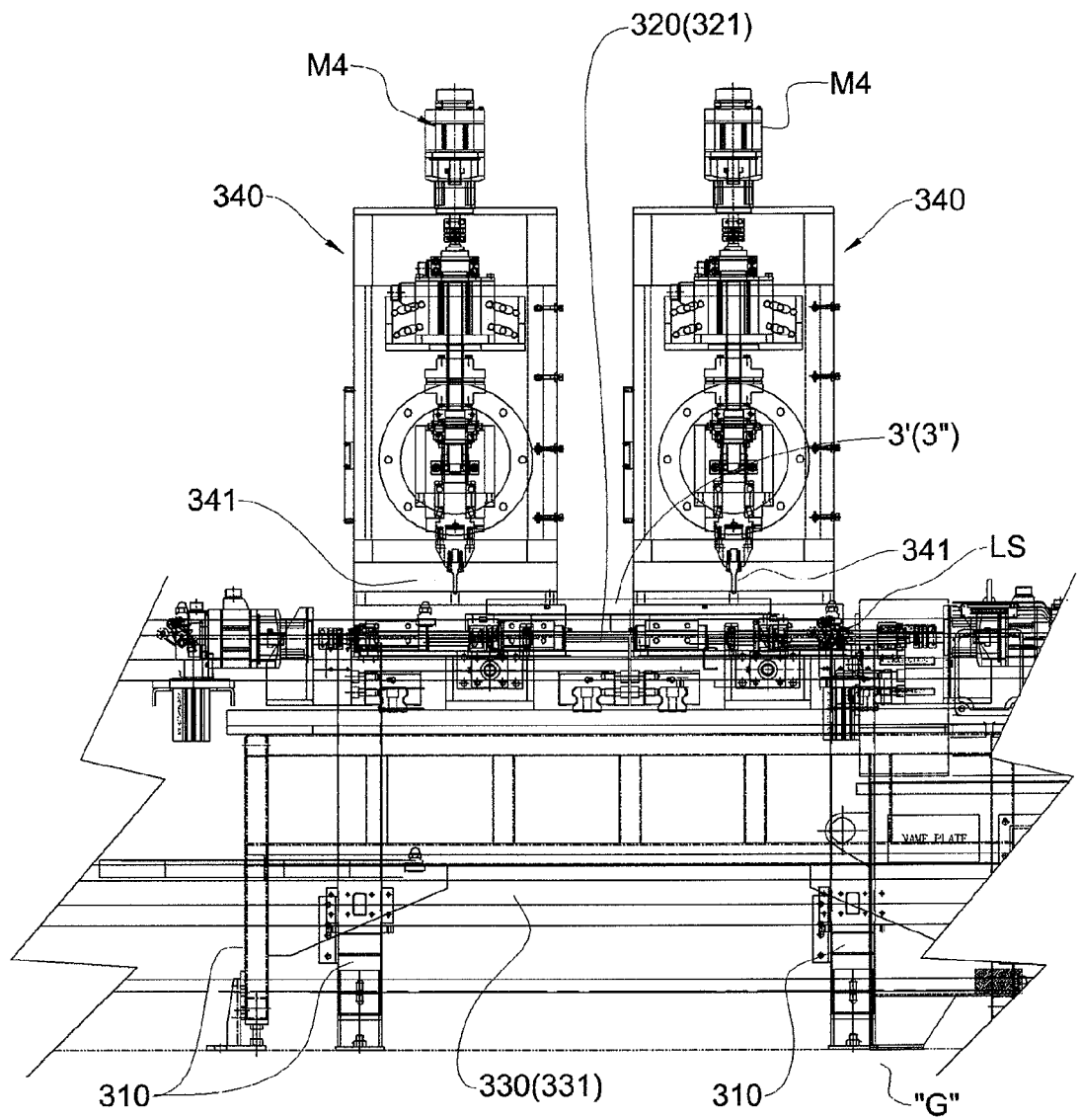
[Fig. 11]

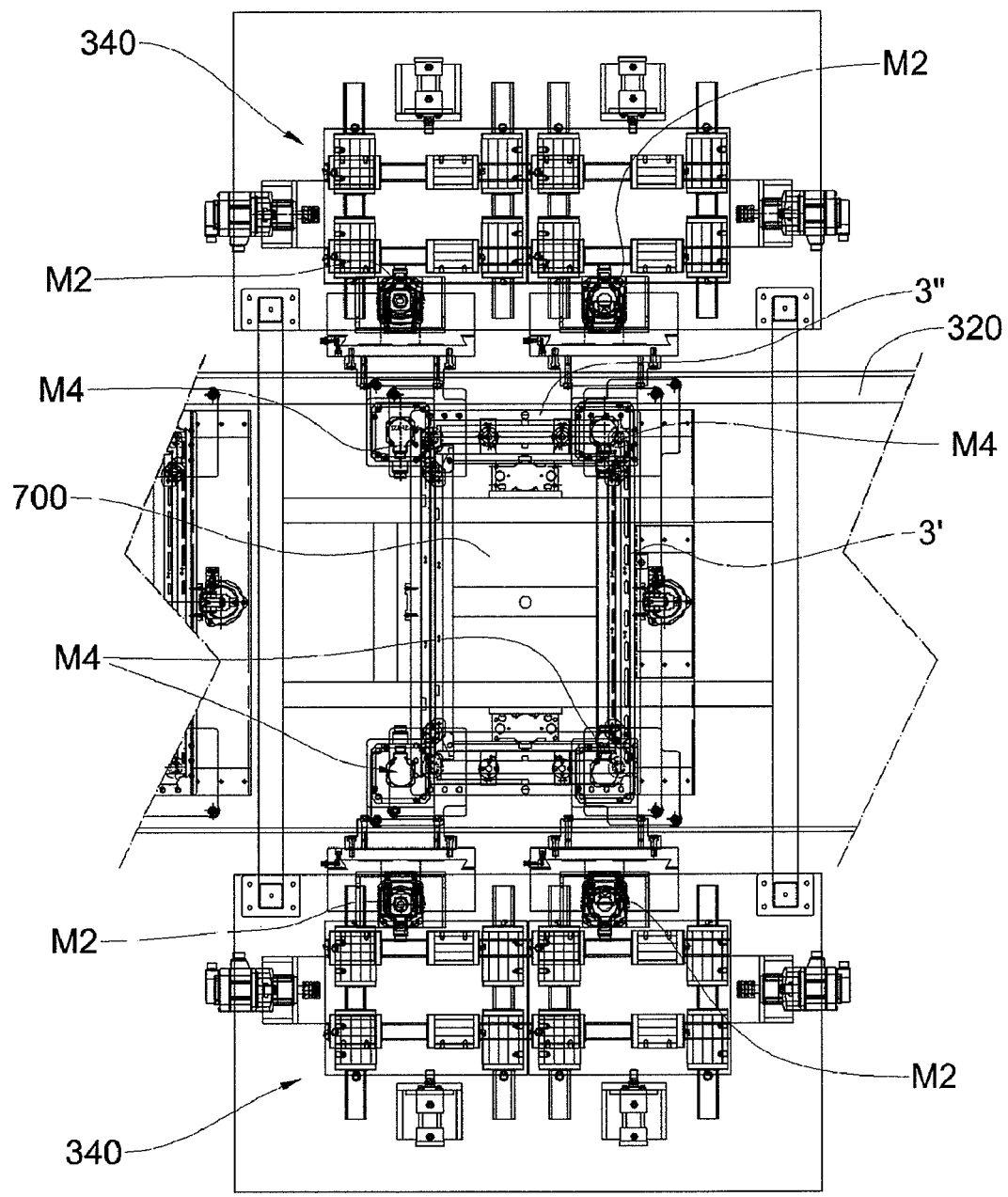
[Fig. 12]

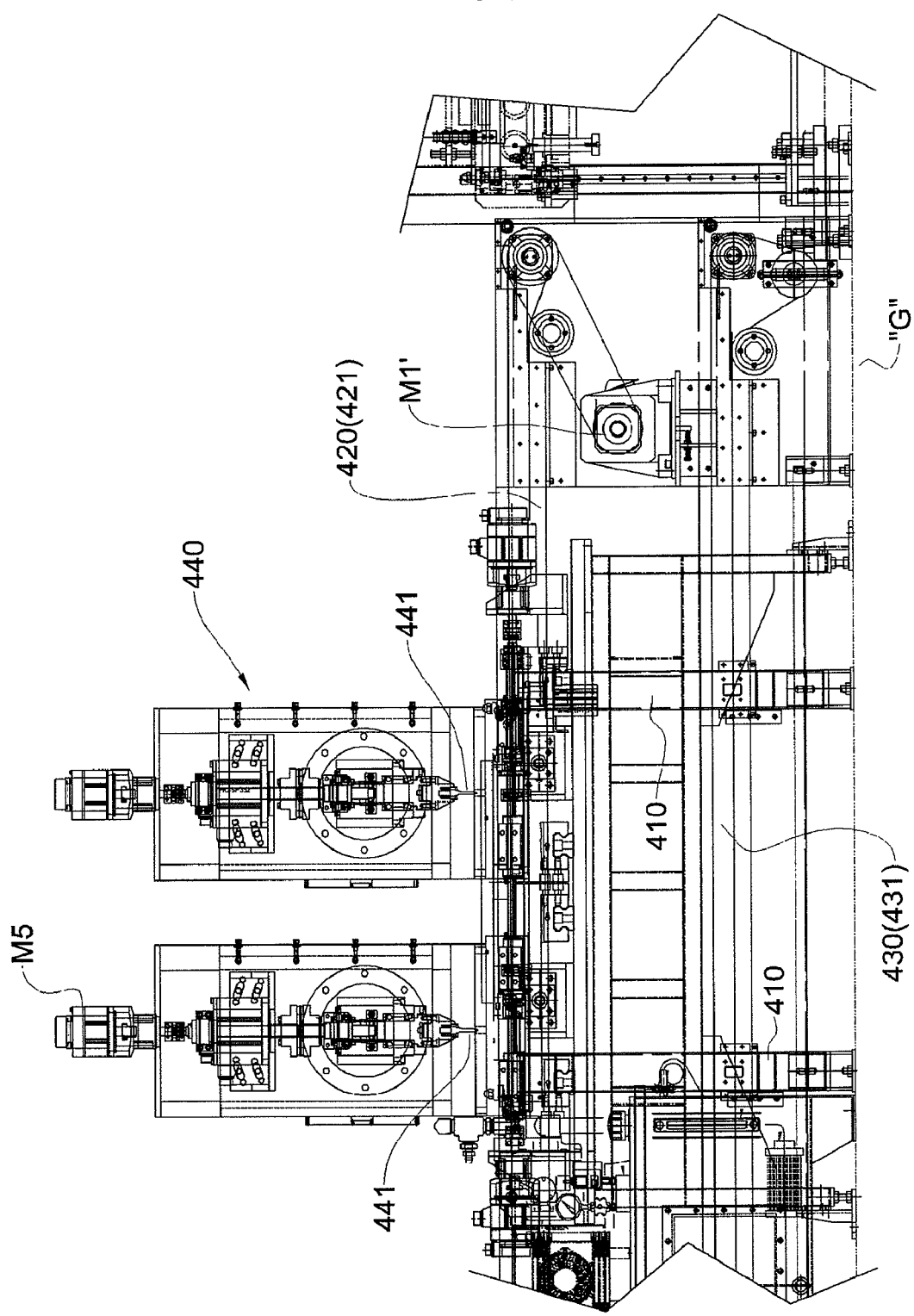
[Fig. 13]

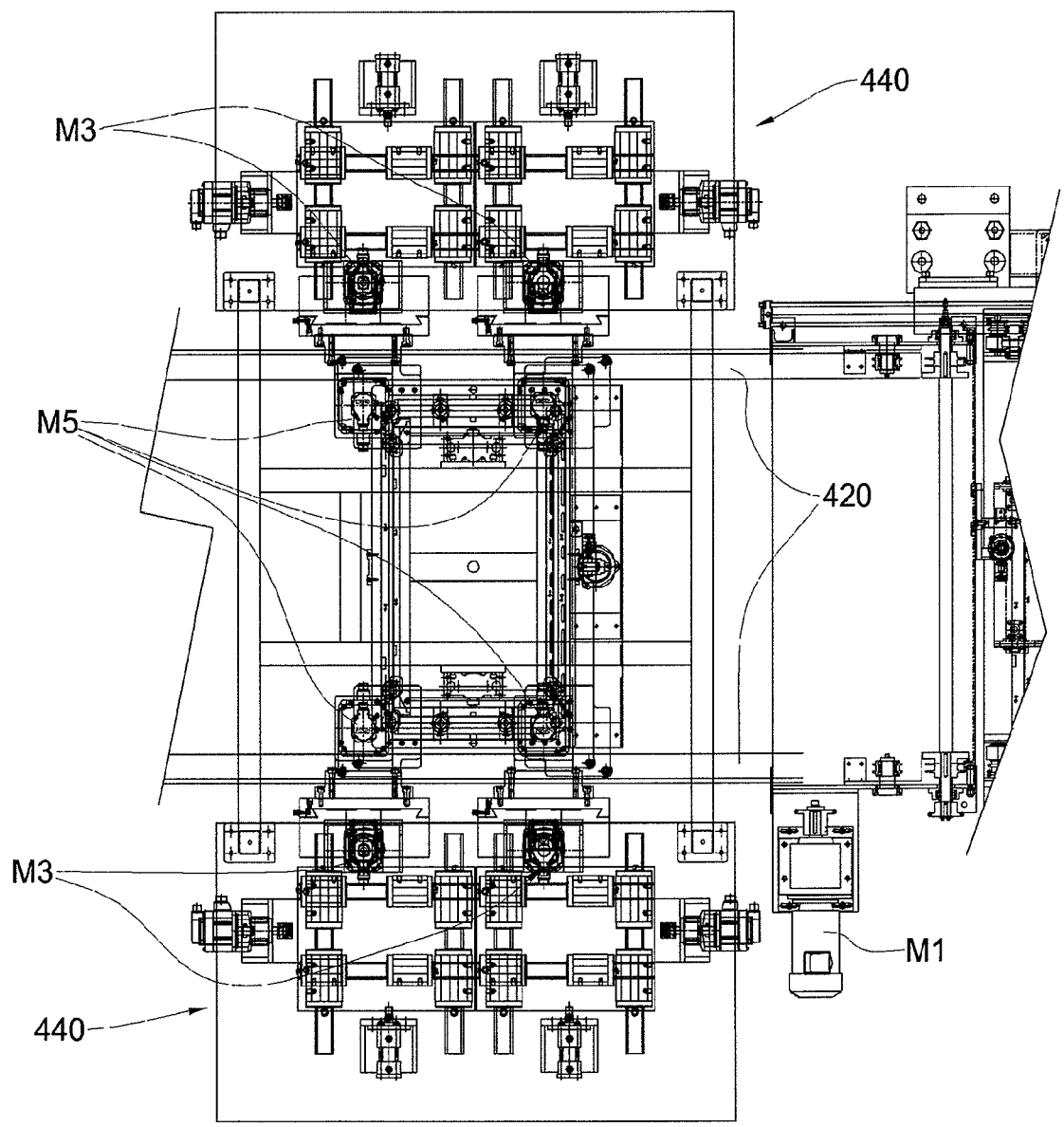
[Fig. 14]

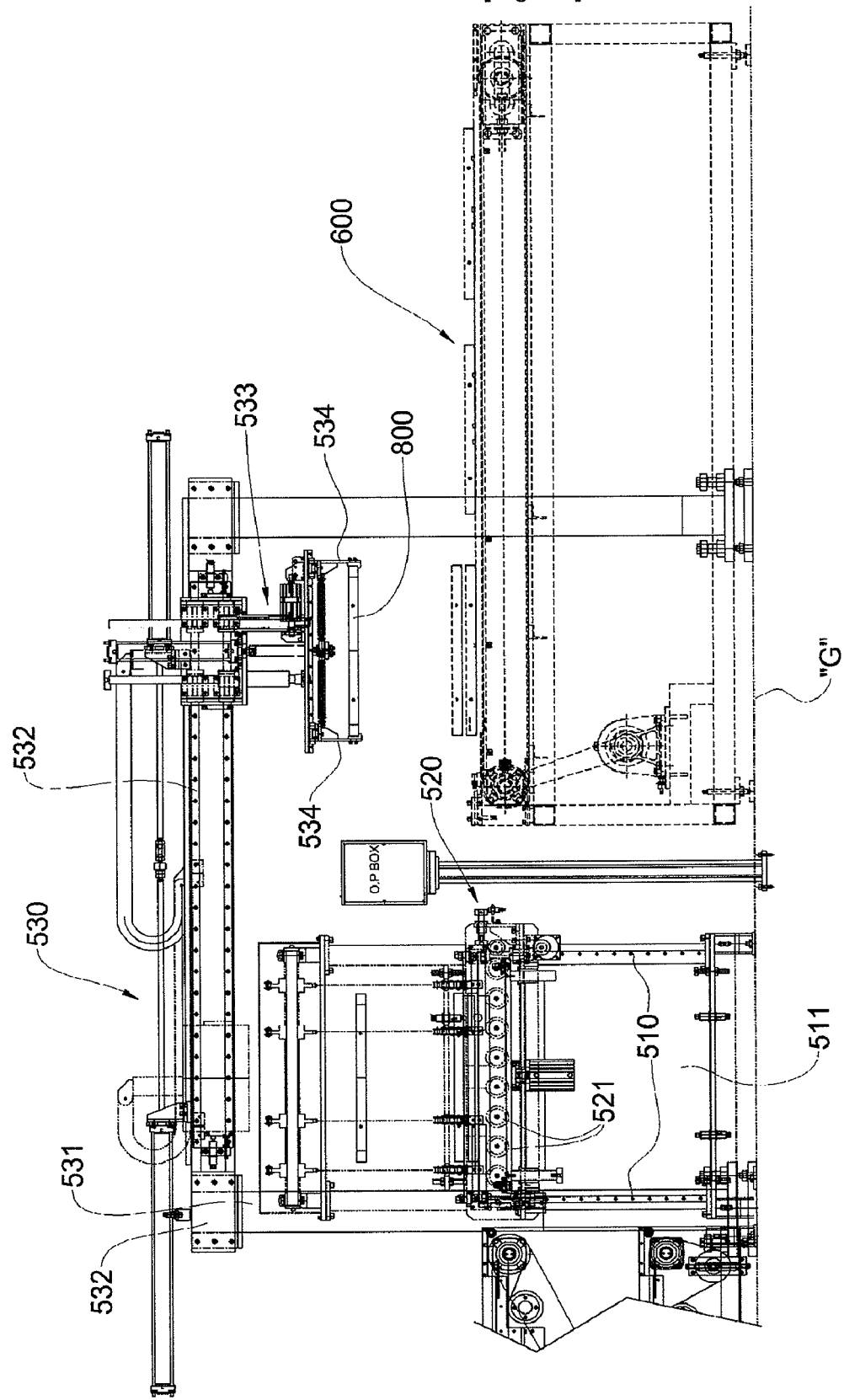
[Fig. 15]

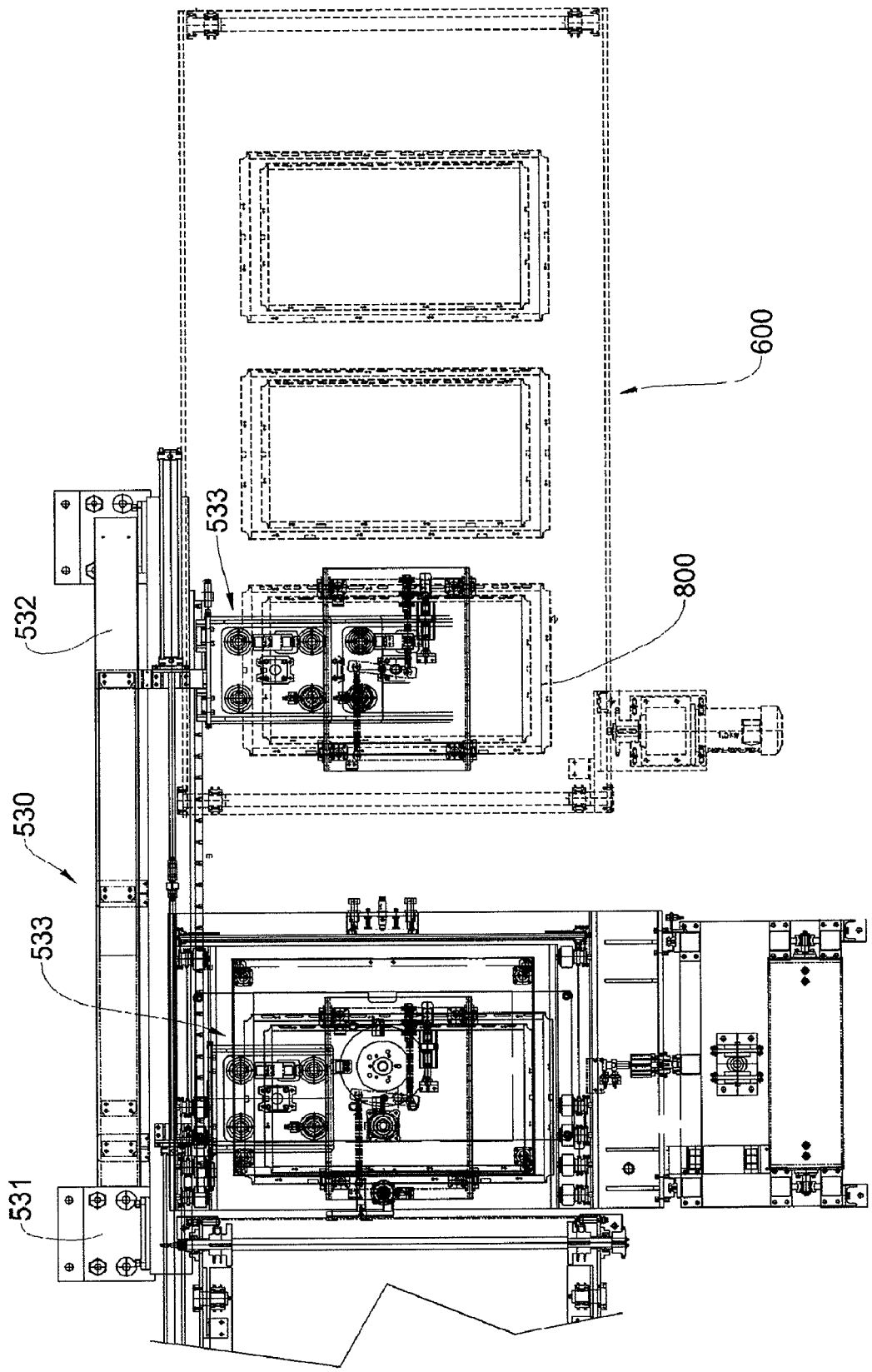
[Fig. 16]

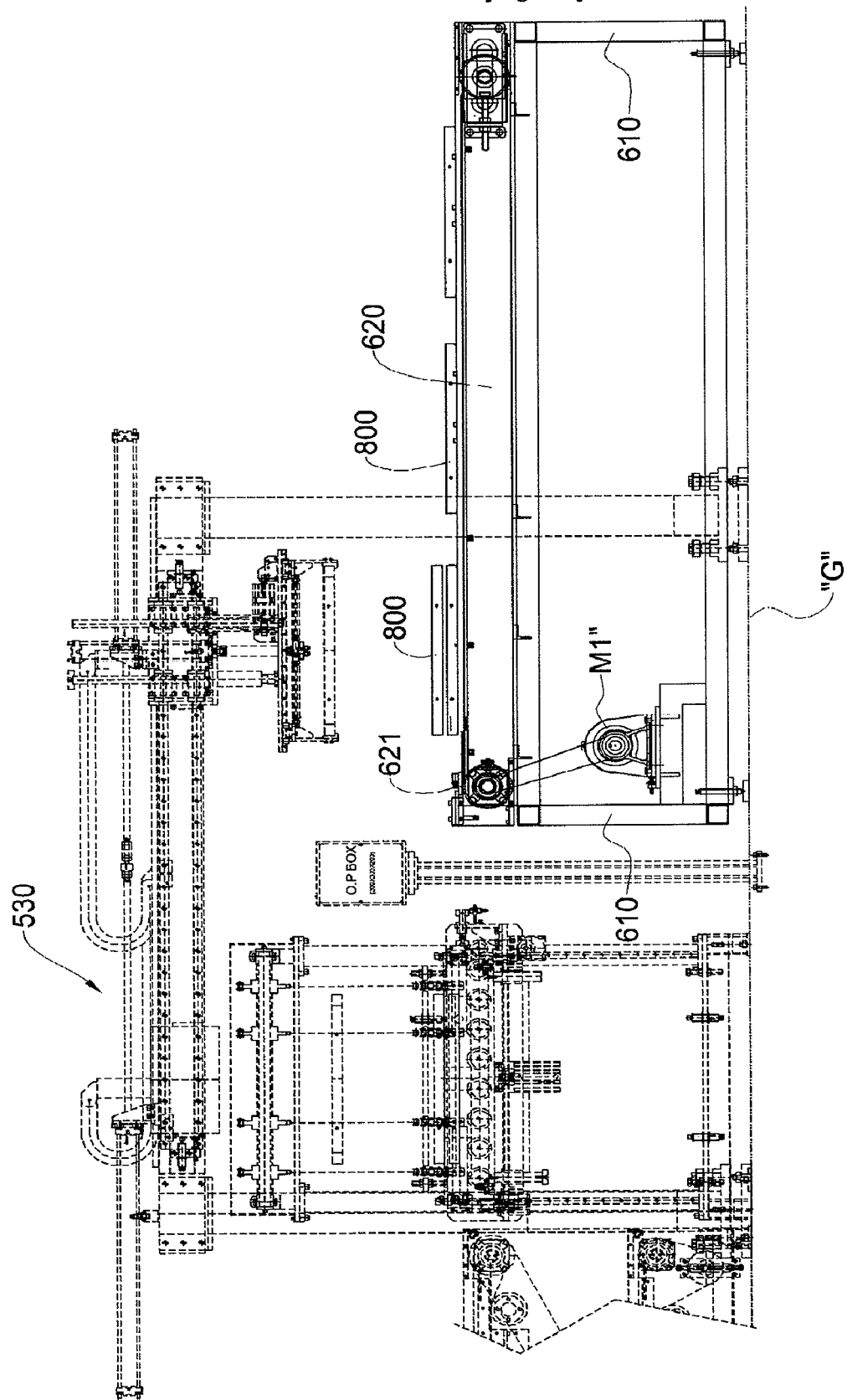
[Fig. 17]

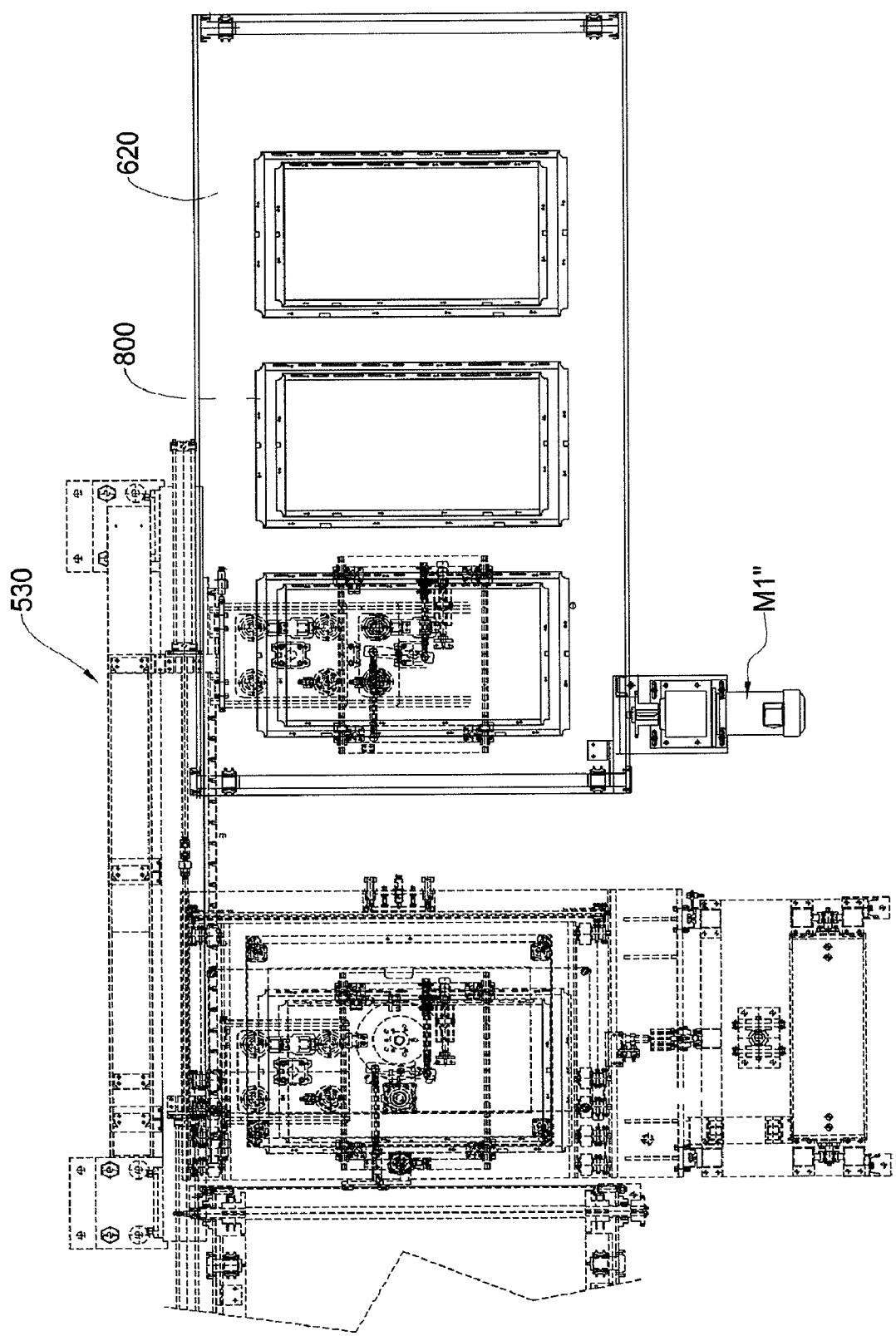
[Fig. 18]

[Fig. 19]
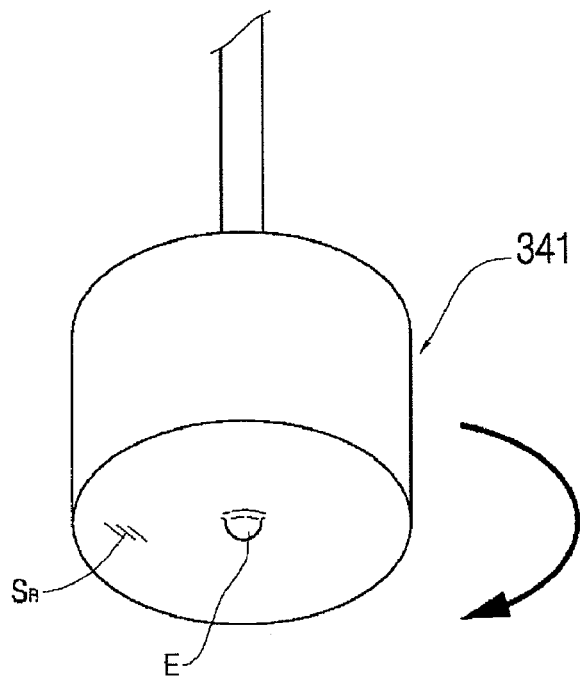
[Fig. 20]
(20a)
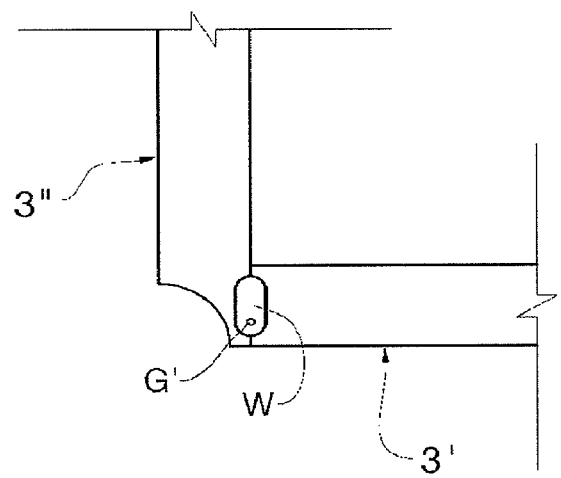
(20b)
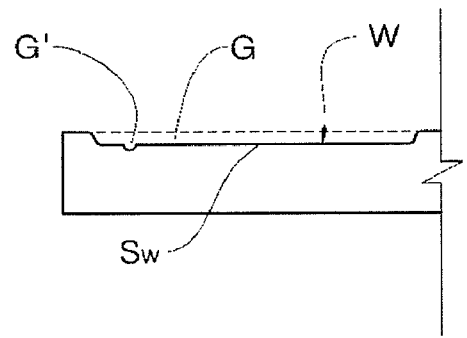

[Fig. 21]
(21a)
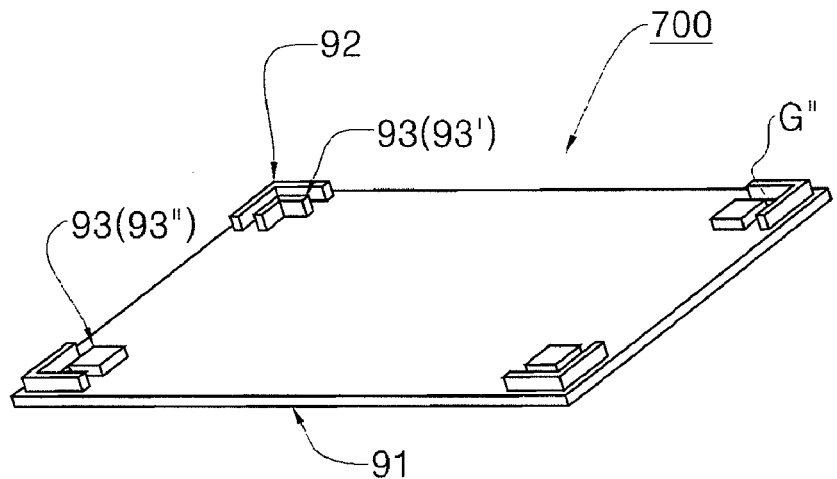
(21b)
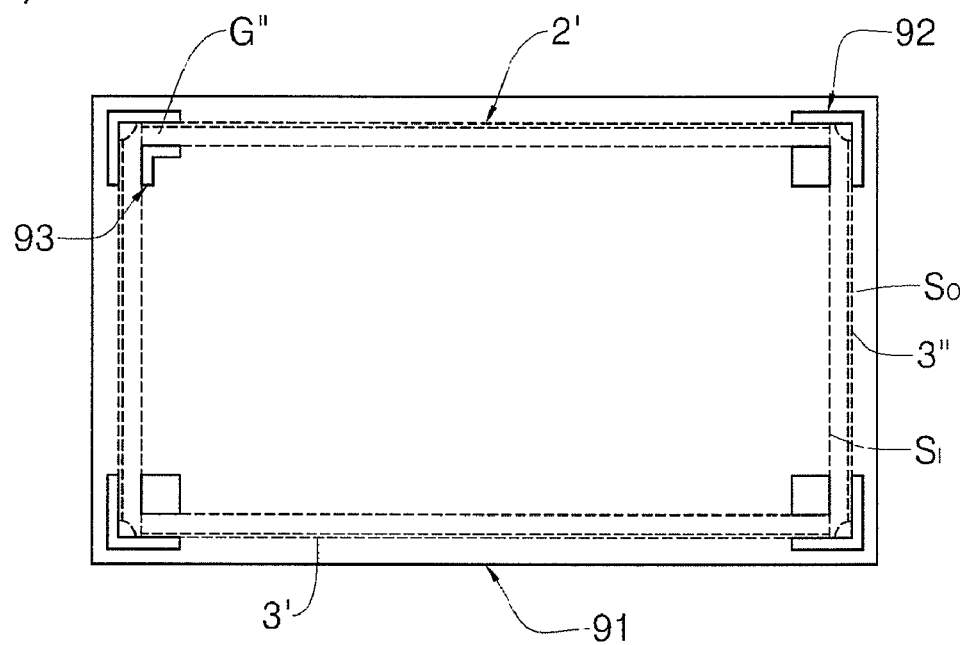

REINFORCEMENT FRAME FOR A DISPLAY PANEL USING EXTRUDED ALUMINUM ALLOY AND APPARATUS AND METHOD FOR MANUFACTURING THE SAME

TECHNICAL FIELD

The present invention relates to a reinforcement frame for a display panel using aluminum alloy extrusion members and an apparatus and a method for manufacturing the same, wherein, while a number of unitary aluminum alloy extrusion members having the sectional shape of "L", "Π", "1", "□" abut one another, a welding head is used to cause the abutting portions to undergo friction resulting from high-speed rotation so that the members are melted and welded to one another by the resulting frictional heat.

BACKGROUND ART

As generally known in the art, display devices are evolving toward better screen quality and a larger screen size in line with the improvement of living standards and the remarkable development of electronic technology. CRTs (cathode ray tubes), also referred to as Braun tubes, have been widely used as typical display devices acting as the final medium of conveying various pieces of information (e.g. TVs, computers), but there are technical limits in various aspects, particularly when it comes to making display devices of forty inches or larger.

That is to say, Braun tubes over forty inches are not only difficult to manufacture, but inevitably have an excessive thickness (and, therefore, overall volume) when made in such a large size. Such excessive size and weight limit the installation space, and make transportation and handling difficult.

Therefore, various types of flat display panels have been developed, which are thin enough to be hung on a wall (i.e. little limitations on the installation space) and which have a screen size of forty inches or larger. Flat display panels are classified into those capable of emitting light on their own, including FED (field emission display) panels, EL (electroluminescence) panels, and PDPs (plasma display panels), and those incapable of emitting light on their own, including LCD (liquid crystal display) panels and ECD (electrochromic display) panels.

Among the above-mentioned flat display panels, PDPs and LCD panels are drawing the most attention recently, and are evolving fast enough to be used for TVs of fifty inches or larger.

Both PDP and LCD panel manufacturers are fiercely competing to dominate the large TV market, and, as a result, the PDP manufacturers have succeeded in reducing power consumption to some extent, and the LCD panel manufacturers in making larger panels. Although LCD panels have the drawback of having residual images burned into the screen when moving images are played, they are superior to PDPs in terms of power consumption and smoothness of images, and are prevailing in the TV market of fifty inches or less.

As LCD panels have become widespread as mentioned above, manufacturers are competing to reduce the manufacturing cost and develop panels that are light and slim enough to be hung on the wall. However, conventional metal reinforcement frames used to reinforce display panels (e.g. LCD panels, PDPs) have the following problems.

Referring to FIG. 1, a conventional display panel (e.g. LCD panel or PDP) includes a display panel body 1, an inner frame 2 made of synthetic resin in a square shape and coupled to the entire lateral surface of the display panel body 1, and a reinforcement frame 3 having a square overall shape and an L-shaped sectional shape so that it is fastened to the front and lateral surfaces Sf and Ss of the inner frame 2.

Reference numeral H refers to a bolt hole used to couple the reinforcement frame 3 to the inner frame 2.

The reinforcement frame 3 used for the conventional display panel is fabricated by press-working an electric zinc-plated steel plate or a zinc-aluminum-plated steel plate (e.g. galbanum steel plate). However, the fact that the plated steel plate is processed into a square frame by discarding the central portion, which occupies the most area of the plate, to obtain the edge increases the manufacturing cost.

Furthermore, the use of plated steel plates is detrimental to making lighter display panels. If the surface plating is peeled off during transportation or storage, rust may spread on the exposed surface.

It has recently been proposed to separately produce members, which are supposed to constitute respective sides of a square frame, through a press process, for example, arrange the members on a jig so that they overlap each other at a right angle, and subject the overlapping corner portions to spot welding to complete a square frame. However, this type of manufacturing method has a problem in that it is difficult to maintain an appropriate level of bonding strength and that the long welding period increases the manufacturing cost.

DISCLOSURE OF INVENTION

Technical Problem

Therefore, the present invention has been made in view of the above-mentioned problems, and the object of the present invention is to provide a reinforcement frame for a display panel using aluminum alloy extrusion members and an apparatus and a method for manufacturing the same, wherein, while a number of unitary aluminum alloy extrusion members abut one another, a welding head is used to cause the abutting portions to undergo friction resulting from high-speed rotation so that the members are melted and welded to one another by the resulting frictional heat, thereby facilitating the welding process and shortening the welding time.

Technical Solution

The object of the present invention is accomplished by mounting a number of unitary reinforcement frames, which are supposed to constitute a reinforcement frame for a display panel, so as to abut one another on a separate frame jig, automatically welding and surface-treating the abutting portions of the unitary reinforcement frames, and separately recovering the welded reinforcement frame and the frame jig.

Advantageous Effects

The present invention is advantageous as follows: respective ends of four unitary aluminum alloy extrusion members, which are supposed to constitute a square frame, are forced against one another at a right angle, and a welding head is used to cause the abutting portions to undergo friction resulting from high-speed rotation so that the members are welded to one another while the four unitary aluminum alloy extrusion members are retained on the frame jig. This standardizes the pre-welding task, facilitates the welding process, and reduces the welding time.

The apparatus for manufacturing a reinforcement frame for a display panel using aluminum alloy extrusion members according to the present invention is adapted to support four unitary aluminum alloy extrusion members on the frame jig and automatically weld the members by a frame welder. This improves the welding reliability, increases the welding strength, and guarantees the same result with regard to repeated welding processes.

In addition, the welding process is followed by a separate process for completely removing fine surface protrusions that roughen the welded surface (i.e. burrs). This provides an aesthetic appearance. Furthermore, the fact that the welded surface remains smooth without any alien substances fundamentally prevents the surface of the display panel from being scratched and the interior of the display panel from being short-circuited.

BRIEF DESCRIPTION OF THE DRAWINGS

The foregoing and other objects, features, and advantages of the present invention will become more apparent from the following detailed description when taken in conjunction with the accompanying drawings in which:

FIG. 1a is a partially broken perspective view of a conventional display panel;

FIG. 1b is a sectional view of the conventional display panel;

FIG. 2a is a front perspective view of a reinforcement frame for a display panel according to an embodiment of the present invention;

FIG. 2b is a rear perspective view of the reinforcement frame for a display panel according to an embodiment of the present invention;

FIG. 3 is a block diagram showing processes of a method for manufacturing a reinforcement frame for a display panel according to an embodiment of the present invention;

FIG. 4 is a front view of an apparatus for manufacturing a reinforcement panel for a display panel according to the present invention;

FIG. 5 is a top view of an apparatus for manufacturing a reinforcement panel for a display panel according to the present invention;

FIG. 6 is a right side view of an apparatus for manufacturing a reinforcement panel for a display panel according to the present invention;

FIG. 7 is a front view of a frame introduction unit of an apparatus for manufacturing a reinforcement frame for a display panel according to the present invention;

FIG. 8 is a top view of a frame introduction unit of an apparatus for manufacturing a reinforcement frame for a display panel according to the present invention;

FIG. 9 is a front view of a jig transfer unit of an apparatus for manufacturing a reinforcement frame for a display panel according to the present invention;

FIG. 10 is a top view of a jig transfer unit of an apparatus for manufacturing a reinforcement frame for a display panel according to the present invention;

FIG. 11 is a front view of a frame welding unit of an apparatus for manufacturing a reinforcement frame for a display panel according to the present invention;

FIG. 12 is a top view of a frame welding unit of an apparatus for manufacturing a reinforcement frame for a display panel according to the present invention;

FIG. 13 is a front view of a welded surface treatment unit of an apparatus for manufacturing a reinforcement frame for a display panel according to the present invention;

FIG. 14 is a top view of a welded surface treatment unit of an apparatus for manufacturing a reinforcement frame for a display panel according to the present invention;

FIG. 15 is a front view of a jig recovery unit of an apparatus for manufacturing a reinforcement frame for a display panel according to the present invention;

FIG. 16 is a top view of a jig recovery unit of an apparatus for manufacturing a reinforcement frame for a display panel according to the present invention;

FIG. 17 is a front view of a frame transfer unit of an apparatus for manufacturing a reinforcement frame for a display panel according to the present invention;

FIG. 18 is a top view of a frame transfer unit of an apparatus for manufacturing a reinforcement frame for a display panel according to the present invention;

FIG. 19 is a perspective view of a welding head used for rotational friction welding;

FIG. 20 is a top view of a rotational friction welding unit;

FIG. 21a is a perspective view of a frame jig for retaining a frame member according to the present invention; and FIG. 21b is a top view of a frame jig for retaining a frame member according to the present invention.

MODE FOR THE INVENTION

The above-mentioned object of the present invention is accomplished by employing aluminum alloy extrusion members and a rotational friction welding method.

The reinforcement frame for an LCD panel using aluminum alloy extrusion members according to the present invention is obtained by extruding four frame members so as to create an L-shaped section, cutting the members into a suitable length, and tightly coupling the members to one another in a square frame shape. The technical characteristics lie in the fact that respective ends of the frame members are forced against one another, and the four corner portions are coupled to one another by a rotational friction welding method.

The aluminum alloy used for the reinforcement frame according to the present invention is wrought aluminum, the most widely accepted classification of which is as follows: 1000 series are pure aluminum with at least 99.00 wt % aluminum content; 2000 series are Al—Cu alloy; 3000 series are Al—Mn alloy; 4000 series are Al—Si alloy; 5000 series are Al—Mg alloy; 6000 series are Al—Mg—Si alloy; and 7000 series are Al—Zn—Mg alloy. All series of aluminum alloy can be used for the reinforcement frame according to the present invention, except for 1000 series lacking in strength. However, considering the price, ease of extrusion, and strength, 6000 series aluminum alloy is the most preferred.

The method for manufacturing a reinforcement frame according to the present invention, which is obtained by cutting bar-type aluminum alloy extrusion members and welding the resulting four frame members to couple them, includes an extrusion step; a heat-treatment step; a step of cutting the extrusion members to obtain frame members; a step of press-working the frame members; a step of retaining two pairs of bar-type frame members in a square frame shape on a jig; welding four corner portions of the square frame; and removing the welding burrs from the four corner portions. The heat-treatment step and the welding step, which count the most among the various processes, will now be described in more detail.

In the heat-treatment step, aluminum alloy billets are heated and extruded to obtain extrusion members, which are treated to uniformize their material and endow them with proper mechanical properties. The members are heated for 1-20 hours at 150-210° C. depending on their thickness. If the lower limit of temperature or time is not reached, the uniformity of the extrusion members degrades, and so does the durability. If the upper limit is exceeded, the strength is insufficient. The thickness of the extrusion members is in the range of 0.8-3.0 mm.

In the welding step, two frame members are forced against each other at a right angle on the same plane, and the abutting boundary portions, i.e. the corner portions of the square frame are welded to each other. Laser welding or MIG welding may be employed to weld the aluminum alloy. However, the laser welding relies on an expensive welding machine, and the MIG welding requires the supply of shield gas by using complicated devices. Therefore, the present invention adopts a rotational friction welding method.

As used herein, the rotational friction welding refers to a type of welding method using a welding head which has a protrusion extending downward form the center of a flat, circular bottom surface and which rotates at a high speed. The method includes the steps of forcing respective corner portions of two frame members against each other so that they are arranged in a square frame shape, compressing the welding head against the surface of the abutting boundary portions so that the protrusion on the bottom surface of the welding head is inserted into the frame members and the bottom surface of the welding head is forced against the surface of the frame members, and moving the welding head along the abutting boundary portions while rotating the welding head at a high speed.

Particularly, the welding head is rotated at a high speed while its bottom surface is forced against the surface of two abutting frame members, and frictional heat is created between the surface of the two frame members and the bottom surface of the welding head. The frictional heat melts both frame members, which are then intermixed and cooled. As a result, their abutting boundary portions are welded to each other.

The protrusion at the center of the bottom surface of the welding head welds not only the surface of the abutting boundary portions of both frame members, but also the interior. Although four corner portions of the square frame may be welded one after another, they may be welded simultaneously by four welding heads for higher productivity.

The apparatus for manufacturing a reinforcement frame for a display panel using aluminum alloy extrusion members according to the present invention includes a frame introduction unit having a first support platform installed on the floor and a first jig bearing panel adapted to move in the upward/downward direction at the center of the first support platform and provided with a first frame jig transfer tool installed so that the frame jig can move on the upper side; a jig transfer unit having a second support platform installed on the floor and first upper and lower frame jig transfer bodies fixed to the second support platform one above the other in parallel, the first upper and lower frame jig transfer bodies having a second frame jig transfer tool installed so that the frame jig can move on the upper side and a second frame jig recovery tool installed so that the frame jig can be recovered, respectively; a frame welding unit having a third support platform installed on the floor, second upper and lower frame jig transfer bodies fixed to the third support platform one above the other in parallel and positioned at the same level as the first upper and lower first frame jig transfer bodies, respectively, and a frame welder installed vertically above the second upper frame jig transfer body, the second upper and lower jig transfer bodies having a third frame jig transfer tool installed so that the frame jig can move on the upper side and a third frame jig recovery tool installed so that the frame jig can be recovered, respectively; a welded surface treatment unit having a fourth support platform installed on the floor, third upper and lower frame jig transfer bodies fixed to the fourth support platform one above the other in parallel and positioned at the same level as the first upper and lower first frame jig transfer bodies, respectively, and a welded surface treatment device installed vertically above the third upper frame jig transfer body, the third upper and lower jig transfer bodies having a fourth frame jig transfer tool installed so that the frame jig can move on the upper side and a fourth frame jig recovery tool installed so that the frame jig can be recovered, respectively; a jig recovery unit having a fifth support platform installed on the floor and provided with a movement space extending through the center in the upward/downward direction, a second jig bearing panel adapted to move in the movement space in the upward/downward direction and provided with a fifth frame jig transfer tool installed so that the frame jig can move on the upper side, and a frame recovery device installed vertically above the second jig bearing panel; and a frame transfer unit having a sixth support platform installed on the floor and a frame transfer body fixed to the sixth support platform in the horizontal direction and installed so that the welded reinforcement frame can move on the upper side.

The apparatus for manufacturing a reinforcement panel for a display panel using aluminum alloy extrusion members according to the present invention is operated as follows: a pair of long/short frame members, which correspond to four unitary aluminum alloy extrusion members constituting a square frame, are placed on a separate frame jig so that respective ends abut one another at a right angle. The welding head is used to cause the abutting portions to undergo friction resulting from high-speed rotation so that they are welded. The sharp surface protrusions making the welded surface rough are removed by the welded surface treatment device. The welded reinforcement frames and frame jigs are continuously classified and recovered. Respective components will now be described in more detail.

The frame introduction unit of the apparatus for manufacturing a reinforcement frame for a display panel using aluminum alloy extrusion members according to the present invention is a preparatory device used in the following manner: a pair of long/short frame members, which constitute a square reinforcement frame, are placed on a frame jig in a preliminary process so that respective ends abut one another at a right angle. The members are ready to be moved by the jig transfer unit and welded in the subsequent process. The frame introduction unit has a first jig bearing panel on which the frame jig is stacked. The first jig bearing panel is adapted to move up and down in the central space of the first support platform of the frame introduction unit at a predetermined time interval.

The frame jig is used to retain the four unitary aluminum extrusion members in a square shape for easy welding. The frame jig is made of a plate material, and has a number of retaining guide protrusions on its upper surface so that a pair of long/short frame members are retained in a predetermined position while respective ends are forced against one another.

When a pair of long/short frame members are introduced onto the frame jig manually or automatically, the frame welder welds respective abutting portions. Fine protrusions on the welded surface are removed for finish treatment. The welded reinforcement frame and the frame jig are separately recovered. The frame jig then returns to the frame introduction unit. In this manner, the frame jig is continuously circulated and reused to weld reinforcement frames.

When a pair of long/short frame members are introduced and seated on the frame jig, the first jig bearing panel lies in the highest position within the central space of the first support platform of the frame introduction unit. When the frame jig is to be recovered after the welding and welded surface treatment processes, the first jig bearing panel is lowered, particularly, moved to the lowest position within the central space of the first support platform.

In other words, the first jig beaming panel of the frame introduction unit according to the present invention is in the highest position within the central space of the first support platform of the frame introduction unit throughout the processes ranging from member introduction and welded surface treatment. When the frame jig is recovered, the first jig bearing panel is placed in the lowest position within the central space of the first support platform. The first jig bearing panel remains in the lowest position for a predetermined period of time, and then returns to the highest position.

The first jig bearing panel has a number of driving rollers or conveyer belts on the upper side so that, when a pair of long/short frame members are fully seated on the frame jig, the frame jig is slid horizontally for the next process and, when the frame jig is separately recovered after the welded surface treatment process, the frame jig easily returns to and stays in the original position on top of the first jig bearing panel.

The jig transfer unit of the apparatus for manufacturing a reinforcement frame for a display panel according to the present invention is used to transfer a number of frame jigs, on which a pair of long/short frame members are seated, respectively, one after another to the frame welding device for the subsequent process. The jig transfer unit is adapted to transfer each frame jig with predetermined timing. The transfer speed and standby time of the frame jig is correlated with the welding time in the next process.

As shown in the drawings, the frame welding unit according to the present invention includes a number of welders, particularly two sets of welders (each set consists of four welders). The two sets of welders simultaneously weld a pair of long/short frame members placed on the upper of each of two frame jigs. After the welding is completed, two new frame jigs that have been ready for welding are transferred and controlled to stop vertically below the corresponding welders.

The jig transfer unit according to the present invention includes a first upper frame jig transfer body for transferring the frame jig to the frame welding unit and a first lower frame jig transfer body for returning frame jigs, which have been recovered separately from the welded reinforcement frame, to the frame introduction unit. The first upper and lower frame jig transfer bodies have a number of driving rollers or conveyer belts and a number of limit switches placed at a predetermined interval. The driving rollers or conveyer belts transfer respective frame jigs at a predetermined speed. When the limit switches recognize an approaching frame jig, they generate a control signal for stopping the rollers so that the frame jig stops in a specific position.

Particularly, the first upper and lower frame jig transfer bodies are horizontally coupled to the second support platform, which is installed on the floor, in parallel with each other in the longitudinal direction. The level of the first upper and lower frame jig transfer bodies correspond to the highest and lowest positions of the first jig beaming panel of the frame introduction unit, respectively, so that the entire process is conducted at the same levels as the highest and lowest positions.

The frame welding unit of the apparatus for manufacturing a reinforcement frame for a display panel according to the present invention uses a welding head mounted on the welder to cause the abutting portions of a pair of long/short frame members, which are placed on top of each frame jig transferred by the jig transfer unit in the previous process, to undergo friction resulting from high-speed rotation so that the resulting frictional heat melts the frame members and welds them to one another.

The frame welding unit according to the present invention includes a support platform installed on the floor, second upper and lower frame jig transfer bodies fixed to the support platform one above the other in parallel and positioned at the same level as the first upper and lower first frame jig transfer bodies, respectively, and a frame welder installed vertically above the second upper frame jig transfer body. The second upper and lower jig transfer bodies have a number of driving rollers or conveyer belts on the upper side. At least one limit switch is coupled to the upper frame jig transfer body.

When each limit switch senses the movement of a transferred frame jig to a designated position, as shown, a control signal causes the driving rollers or conveyer belts to stop functioning so that the frame jig stops. After a moment, the welding head of each frame welder descends and moves horizontally along the abutting portions of the unitary aluminum alloy extrusion members as much as the region to be welded. The high-speed rotation of the welding head causes friction, which melts and welds the frame members to one another. After the welding is over, the head of the frame welder returns to the original position and stops rotating.

The welded surface treatment unit of the apparatus for manufacturing a reinforcement frame for a display panel according to the present invention is operated as follows: each frame jig is transferred from the frame welding unit in the previous process with welded aluminum alloy extrusion members placed on its upper side. The surface treatment tool mounted on the welded surface treatment device subjects the welded portions to high-speed rotation so that fine, sharp protrusions formed on the welded surface during the welding process (i.e. burrs) are removed.

The welded surface treatment unit according to the present invention has a support platform installed on the floor, third upper and lower frame jig transfer bodies fixed to the support platform one above the other in parallel and positioned at the same level as the first upper and lower first frame jig transfer bodies, respectively, and a welded surface treatment device installed vertically above the third upper frame jig transfer body. The third upper and lower jig transfer bodies have a number of driving rollers or conveyer belts on the upper side. A limit switch is coupled to the upper frame jig transfer body.

When the limit sensors sense the movement of a transferred frame jig to a designated position, as shown, a control signal causes the driving rollers or conveyer belts to stop functioning so that the frame jig stops. After a moment, the surface treatment tool of the welded surface treatment device descends and moves horizontally along the abutting portions of the pair of long/short frame members. The high-speed rotation of the tool removes fine, sharp protrusions formed on the welded surface during the welding process. After the welded surface treatment is over, the surface treatment tool of the welded surface treatment device returns to the original position and stops rotating.

The jig recovery unit of the apparatus for manufacturing a reinforcement frame for a display panel according to the present invention is operated as follows: after a pair of long/short frame members undergo welding and welded surface treatment to complete a single panel reinforcement panel, the frame jig is separated from the panel reinforcement frame and is recovered to reuse it as a single unit. The vertically overlying frame recovery device lifts the completed panel reinforcement frame and then lowers the frame jig so that it is finally ready to be transferred to the lowest position in which the first jig bearing panel of the frame introduction unit stands by.

As shown in the drawings, the jig recovery unit of the apparatus for manufacturing a reinforcement frame for a display panel according to the present invention has a fifth support platform having a movement space extending through the center in the upward/downward direction, a second jig bearing panel adapted to move in the movement space in the upward/downward direction and provided with a number of driving rollers or conveyer belts on the upper side so that the frame jig can move, and a frame recovery device installed vertically above the second jig bearing panel. The second jig bearing panel is adapted to regularly move up and down between the highest and lowest positions of the first jig bearing panel of the frame introduction unit so that the rollers installed on the upper side are operated to transfer the stacked frame jigs while moving them left and right.

Particularly, if a reinforcement frame is transferred after welding and surface treatment, the frame recovery device senses it and causes the working arm to descend and lift the reinforcement frame. The frame moves horizontally along the recovery frame to the frame transfer unit for the next process. The working arm descends again and places the reinforcement frame on the frame transfer body of the frame transfer unit so that the completed reinforcement frame is ready to be transferred.

The frame recovery device of the jig recovery unit according to the present invention includes an extension frame extending upward from one side of the fifth support platform while being fixed to the side, a beam-shaped recovery device frame coupled to the extension frame and installed vertically above the second jig bearing panel in the horizontal direction, and a working arm assembly adapted to slide along the recovery device frame. The working arm assembly includes a number of working arms adapted to move vertically and grasp/release a welded reinforcement frame according to a control signal.

The frame transfer unit of the apparatus for manufacturing a reinforcement frame for a display panel according to the present invention is adapted to transfer respective reinforcement frames, which are supplied after being separately recovered by the frame recovery device of the jig recovery unit after the welding and surface treatment, at a predetermined speed so that they are recovered as a whole. The transfer speed of the reinforcement frames and the standby time are correlated with the working speed in the previous process.

As shown, the frame transfer unit of the apparatus for manufacturing a reinforcement frame for a display panel according to the present invention has a sixth support platform installed on the floor and a frame transfer body fixed to the sixth support platform in the horizontal direction and installed so that the welded reinforcement frame can move on the upper side. The rollers are controlled to stop and rotate at a predetermined speed so that the separately recovered reinforcements are stacked on top of the frame transfer body. Then, a number of reinforcement frames are transferred simultaneously at a predetermined speed so that the welding operator can put and store them at a separate place.

Hereinafter, a reinforcement frame for a display panel using aluminum alloy extrusion members and an apparatus and a method for manufacturing the same according to preferred embodiments of the present invention will be described with reference to the accompanying drawings.

FIG. 2 shows a reinforcement frame for a display panel according to an embodiment of the present invention. Particularly, FIG. 2a is a front perspective view of the reinforcement frame, and FIG. 2b is a rear perspective view thereof. FIG. 3 is a block diagram showing processes of a method for manufacturing a reinforcement frame for a display panel according to an embodiment of the present invention.

As shown, the reinforcement frame 3 for a display panel using aluminum alloy extrusion members includes a pair of bar-type long frame members 3' made of extruded aluminum alloy and positioned parallel with each other, and a pair of bar-type short frame members 3" made of extruded aluminum alloy and positioned parallel with each other. Both ends of the short frame members 3" are correspondingly forced against both ends of the long frame members 3' in a square frame shape, and are coupled to them by means of rotational friction welding.

Reference numeral W refers to a welded portion.

The method for manufacturing the reinforcement frame, referring to the drawings, includes the steps of extruding aluminum alloy billets into bar-type extrusion members having an L-shaped section (S10); heat-treating the bar-type extrusion members (S20); cutting the heat-treated extrusion members to obtain long/short frame members 3' and 3" (S30); press-working the long/short frame members 3' and 3" to form various through-holes H', including bolt holes, so that the finally fabricated reinforcement frame can be coupled while being forced against the front and lateral surfaces of the inner frame of the display panel (S40); retaining each pair of long/short frame members 3' and 3" in a square frame shape on a jig (S50); coupling four abutting portions of the two long/short frame members 3' and 3", which are forced against each other at four corner portions of the retained square frame, by a rotational friction welding method (S60); and removing welding burrs from the four corners of the square frame by an end mill (S70).

As a result, it is requested to develop dedicated welding equipment for manufacturing reinforcement frames for display panels by using aluminum alloy extrusion members through the above-mentioned processes.

More specifically, the welding equipment is expected to guarantee constant prewelding work to facilitate the welding process, shorten welding time, improve welding reliability, and increase welding strength. The same task is conducted even if the welding process is repeated. The welded surface remains smooth and clear without any alien substances. This fundamentally prevents the surface of the display panel from being scratched.

FIG. 4 is a front view of an apparatus for manufacturing a reinforcement panel for a display panel according to the present invention, FIG. 5 is a top view of an apparatus for manufacturing a reinforcement panel for a display panel according to the present invention, and FIG. 6 is a right side view of an apparatus for manufacturing a reinforcement panel for a display panel according to the present invention.

As shown, the apparatus for manufacturing a reinforcement panel for a display panel according to the present invention includes a frame introduction unit 100 for mounting a number of unitary reinforcement frames on a frame jig 700, which is placed on top of a first jig bearing panel 120 adapted to move up and down; a jig transfer unit 200 for transferring the frame jig 700 horizontally; a frame welding unit 300 for welding the reinforcement frames by a frame welder 340 installed vertically above an upper frame jig transfer body 320; a welded surface treatment unit 400 for finishing the welded surface of the reinforcement frames; a jig recovery unit 500 for recovering the frame jig 700; and a frame transfer unit 600 for transferring the completely welded reinforcement frames.

More particularly, the apparatus for manufacturing a reinforcement frame for a display panel using aluminum alloy extrusion members according to the present invention includes a frame introduction unit 100 having a first support platform 110 installed on the floor and provided with a movement space 111 extending through the center vertically, and a first jig bearing panel 120 adapted to move within the movement space 111 in the upward/downward direction and provided with a first frame jig transfer tool 121 installed so that the frame jig 700 can move on the upper side, the frame jig 700 being stacked on top of the first frame jig transfer tool 121; a jig transfer unit 200 having a second support platform 210 installed on the floor adjacent to the first support platform 110 and first upper and lower frame jig transfer bodies 220 and 230 fixed to the second support platform 210 one above the other in parallel, the first upper and lower frame jig transfer bodies 220 and 230 having a second frame jig transfer tool 221 installed so that the frame jig 700 can move on the upper side and a second frame jig recovery tool 231 installed so that the frame jig 700 can be recovered, respectively; a frame welding unit 300 having a third support platform 310 installed on the floor adjacent to the second support platform 210, second upper and lower frame jig transfer bodies 320 and 330 fixed to the third support platform 310 one above the other in parallel and positioned at the same level as the first upper and lower first frame jig transfer bodies 220 and 230, respectively, and a frame welder 340 installed vertically above the second upper frame jig transfer body 320, the second upper and lower jig transfer bodies 320 and 330 having a third frame jig transfer tool 321 installed so that the frame jig 700 can move on the upper side and a third frame jig recovery tool 331 installed so that the frame jig 700 can be recovered, respectively; a welded surface treatment unit 400 having a fourth support platform 410 installed on the floor adjacent to the third support platform 310, third upper and lower frame jig transfer bodies 420 and 430 fixed to the fourth support platform 410 one above the other in parallel and positioned at the same level as the first upper and lower first frame jig transfer bodies 220 and 230, respectively, and a welded surface treatment device 440 installed vertically above the third upper frame jig transfer body 420, the third upper and lower jig transfer bodies 420 and 430 having a fourth frame jig transfer tool 421 installed so that the frame jig 700 can move on the upper side and a fourth frame jig recovery tool 431 installed so that the frame jig 700 can be recovered, respectively; a jig recovery unit 500 having a fifth support platform 510 installed on the floor adjacent to the fourth support platform 410 and provided with a movement space 511 extending through the center in the upward/downward direction, a second jig bearing panel 520 adapted to move in the movement space 511 in the upward/downward direction and provided with a fifth frame jig transfer tool 521 installed so that the frame jig 700 can move on the upper side, and a frame recovery device 530 installed vertically above the second jig bearing panel 520; and a frame transfer unit 600 having a sixth support platform 610 installed on the floor adjacent to the fifth support platform 510 and a frame transfer body 620 fixed to the sixth support platform 610 in the horizontal direction and installed so that the welded reinforcement frames 3' and 3" can move on the upper side.

The apparatus for manufacturing a reinforcement panel for a display panel using aluminum alloy extrusion members according to the present invention, which is constructed as mentioned above, is operated as follows: a pair of parallel long frame members 3' made of extruded aluminum alloy and a pair of parallel short frame members 3" made of extruded aluminum alloy are seated on the frame jig 700 by retaining guide protrusions 701 so that both ends of the long frame members 3' are correspondingly forced against both ends of the short frame members 3" at a right angle. The welding head 341 of the frame welder 340 mounted on the frame welding unit 300 is used to cause friction to weld the members. The sharp protrusions on the welded surface are removed by the surface treatment tool 441 mounted on the welded surface treatment device 440. The welded reinforcement frames 800 are continuously separated and recovered from the frame jigs 700, respectively.

Reference numerals M1, M1', and M" refer to roller driving motors, M2 refers to a frame welder transfer motor, M3 refers to a welded surface treatment device transfer motor, M4 refers to a welding head driving motor, and M5 refers to a surface treatment tool driving motor.

FIG. 7 is a front view of a frame introduction unit of an apparatus for manufacturing a reinforcement frame for a display panel according to the present invention, and FIG. 8 is a top view of a frame introduction unit of an apparatus for manufacturing a reinforcement frame for a display panel according to the present invention.

The frame introduction unit 100 of the apparatus for manufacturing a reinforcement frame according to the present invention includes a first support platform 110 installed on the floor G and provided with a movement space 111 extending through the center vertically, and a first jig bearing panel 120 adapted to move within the movement space 111 in the upward/downward direction and provided with a first frame jig transfer tool 121 installed so that the frame jig 700 can move on the upper side. The frame jig 700 is stacked and moved on top of the first frame jig transfer tool 121.

The frame introduction unit 100, which is constructed as mentioned above, is operated as follows: the reinforcement frame operator in front of the unit places a pair of long frame members 3' and a pair of short frame members 3" on the frame jig 700 with the retaining guide protrusions 701 (refer to FIG. 21) so that respective ends abut one another. Then, the frame jig 700 is moved horizontally on the first frame jig transfer tool 121 toward the jig transfer unit 200 for the next process.

When the pair of long/short frame members 3' and 3" are placed on the frame jig 700 by the frame operator, the first jig bearing panel 120 is in the highest position P1. On the other hand, when the frame jig 700 is recovered separately from the reinforcement frame 800 after the welding and surface treatment, the first jig bearing panel 120 is in the lowest position P2. As such, the first jig bearing panel 120 periodically reciprocates between the highest and lowest positions P1 and P2 according to control signals.

FIG. 9 is a front view of a jig transfer unit of an apparatus for manufacturing a reinforcement frame for a display panel according to the present invention, and FIG. 10 is a top view of a jig transfer unit of an apparatus for manufacturing a reinforcement frame for a display panel according to the present invention.

As shown, the jig transfer unit 200 of the apparatus for manufacturing a reinforcement frame according to the present invention includes second support platform 210 installed on the floor G adjacent to the first support platform 110 and first upper and lower frame jig transfer bodies 220 and 230 fixed to the second support platform 210 one above the other in parallel, the first upper and lower frame jig transfer bodies 220 and 230 having a second frame jig transfer tool 221 installed so that the frame jig 700 can move on the upper side and a second frame jig recovery tool 231 installed so that the frame jig 700 can be recovered, respectively.

When the frame jig 700 is transferred to the jig transfer unit 200 according to the present invention with a pair of long/ short frame members 3' and 3" seated thereon, as mentioned above, the frame jig 700 is forcibly transferred on the second frame jig transfer tool 221 mounted on the first upper frame jig transfer body 220 so that the frame jig 700 gradually moves to the frame welding unit 300 for the next process. When the frame jig 700 is recovered, it is transferred on the first lower frame jig transfer body 230 installed below the first upper frame jig transfer body 220 in parallel so that the frame jig 700 is transferred to the frame introduction unit 100 for the next process.

When the frame jig 700 is transferred to the frame welding unit 300 for the next process, the first upper frame jig transfer body 220 is at the same level as the highest position P1 of the first jig bearing panel 120. On the other hand, when the frame jig 700 is recovered separately from the reinforcement frame 800 after the welding and surface treatment, the first lower frame jig transfer body 230 is at the same level as the lowest position P2 of the first jig bearing panel 120.

In order to accelerate the welding process, it is preferred to simultaneously transfer a number of frame jigs 700 on the first upper frame jig transfer body 220 with a pair of long/short frame members 3' and 3" seated thereon, respectively. In order to control the position of each frame jig 700, limit switches Ls are preferably installed along the movement path to sense the movement of the frame jig 700 in each designated position. The limit switches Ls may be replaced with IR-based proximity sensors, touch sensors, or other types of switches.

As such, when the limit switches Ls sense the transfer of a number of frame jigs 700, the second frame jig transfer tool 221 stops rotating. After the subsequent welding process is over, the second frame jig transfer tool 221 resumes rotation so that the target frame jig 700, which has been waiting to be welded, is transferred to the frame welding unit 300.

FIG. 11 is a front view of a frame welding unit of an apparatus for manufacturing a reinforcement frame for a display panel according to the present invention, and FIG. 12 is a top view of a frame welding unit of an apparatus for manufacturing a reinforcement frame for a display panel according to the present invention.

As shown, the frame welding unit 300 of the apparatus for manufacturing a reinforcement frame according to the present invention includes a third support platform 310 installed on the floor G adjacent to the second support platform 210, second upper and lower frame jig transfer bodies 320 and 330 fixed to the third support platform 310 one above the other in parallel and positioned at the same level as the first upper and lower first frame jig transfer bodies 220 and 230, respectively, and a number of frame welders 340 installed vertically above the second upper frame jig transfer body 320, the second upper and lower jig transfer bodies 320 and 330 having a third frame jig transfer tool 321 installed so that the frame jig 700 can move on the upper side and a third frame jig recovery tool 331 installed so that the frame jig 700 can be recovered, respectively.

In order to accelerate the welding process, the frame welding unit 300 preferably has a number of frame welders 340. In order to control the position of a number of frame jigs 700, on which a pair of long/short frame members 3' and 3" are seated, respectively, limit switches Ls are preferably installed along the movement path to sense the approach of the frame jigs 700. The limit switches Ls may be replaced with IR-based proximity sensors, touch sensors, or other types of switches.

As such, when the limit switches Ls sense the movement of a number of frame jigs 700 from the jig transfer unit 200 in the previous process, the third frame jig transfer tool 321 stops rotating. Then, the frame jigs 700 stop moving and wait to be welded.

The frame jigs 700, which are waiting to be welded, are placed vertically below respective frame welders 340, which then descend so that the welding heads 341 (refer to FIG. 19) contact the abutting portions of the pair of long/short frame members 3' and 3". The welding headers 341 rotate while moving horizontally along the boundary surface to weld the reinforcement frames (refer to FIG. 20).

In the case of such rotational friction welding, which relies on the frictional heat between the welding head and the to-be-welded member to weld it, the welding quality depends on the degree of compression of the welding head against the member, the rotation speed, the protrusion height, the movement speed, etc. In the case of the reinforcement frame members according to the present invention, the welding rate of the welding head is regulated in the range of 50-5,000 times/minute, and the movement speed in 10-1,000 m/min according to the thickness of the frame members.

If the welding conditions fall out of the above-mentioned ranges, the coupling force resulting from welding may be insufficient, or the frame members may be punctured due to excessive welding.

Although it is customary to weld and couple respective corner portions of the square frame, which is obtained by forcing each pair of long/short frame members 3' and 3" against each other at a right angle to form a closed loop, one after another by using a single welding head, it is preferred to employ four welding heads, i.e. assign a welding head to each of the four corner portions to weld them at the same time.

In order to remove the burrs from the welded portion after the rotational friction welding, two welded frame members must remain forced and retained firmly. To this end, various types of jigs may be used retain long/short frame members 3' and 3".

In the drawings, reference numerals E refers to a protrusion, G' refers to a protrusion recess, SB refers to a head bottom surface, SW refers to a welded upper surface, and W refers to a welded portion.

For example, as shown in FIG. 21, the frame jig 700 may include a flat base plate 91, two pairs of outer blocks 92 stacked on and coupled to four spots of the upper surface of the base plate 91, which correspond to four corner portions of the square frame 2' before welded into a reinforcement frame 2, and provided with two perpendicular surfaces to be forced against the outer surface SO of respective abutting portions of two perpendicular long/short frame members 3' and 3", and two pairs of inner blocks 93 stacked on and coupled to the four spots of the upper surface of the base plate 91, which correspond to four corners of the square frame 2', and provided with two perpendicular surfaces to be forced against the inner surface SI of the abutting portions of the two perpendicular long/short frame members 3' and 3".

Particularly, the inner and outer blocks 92 and 93 are paired and coupled to the upper surface of the base plate 91, and, when viewed from above, L-shaped seating grooves G are formed between the paired inner and outer blocks 92 and 93 so that four corner portions of the square frame 2', which is obtained by forcing two pairs of frame members 21 and 22 against each other on the same plane, can be fitted and inserted into the grooves.

The inner blocks 93 may be L-shaped blocks 93' or hexahedral blocks 93".

After the welding is over, the welding heads 341 stop rotating, and the frame welders 340 ascend and return to their original positions. After the reinforcement frame 800 is separately recovered by the jig recovery unit 500 (described later), the frame jigs 700 are transferred on the second lower frame jig transfer body 330, which has a third frame jig recovery tool 331 on the upper side and which lies at the same level as the first lower frame jig transfer body 230, so that they are supplied to the frame introduction unit 110 and reused.

FIG. 13 is a front view of a welded surface treatment unit of an apparatus for manufacturing a reinforcement frame for a display panel according to the present invention, and FIG. 14 is a top view of a welded surface treatment unit of an apparatus for manufacturing a reinforcement frame for a display panel according to the present invention.

As shown, the welded surface treatment unit 400 of the apparatus for manufacturing a reinforcement frame according to the present invention includes a fourth support platform 410 installed on the floor adjacent to the third support platform 310, third upper and lower frame jig transfer bodies 420 and 430 fixed to the fourth support platform 410 one above the other in parallel and positioned at the same level as the first upper and lower first frame jig transfer bodies 220 and 230, respectively, and a welded surface treatment device 440 installed vertically above the third upper frame jig transfer body 420, the third upper and lower jig transfer bodies 420 and 430 having a fourth frame jig transfer tool 421 installed so that the frame jig 700 can move on the upper side and a fourth frame jig recovery tool 431 installed so that the frame jig 700 can be recovered, respectively.

The welded surface treatment unit 400 according to the present invention, which is constructed as mentioned above, is operated as follows: when each frame jig 700 is transferred from the frame welding unit 300 in the previous process with the welded reinforcement frame 800 placed on the upper side, the surface treatment tool 441 mounted on the welded surface treatment device 440 rotates at a high speed with regard to the welded portion so that fine, sharp protrusions formed on the welded surface during the welding process are removed.

More particularly, when the limit switches Ls sense the movement of the transferred frame jig 700 to a designated position, a control signal is created to stop the fourth frame jig transfer tool 421 so that the frame jig 700 stops moving. After a moment, the surface treatment tool 441 of the welded surface treatment device 440 descends and moves horizontally along the welded portion of the reinforcement frame 800 while rotating at a high speed so that fine, sharp protrusions formed on the welded surface during the welding process are removed. After the welded surface is completely treated, the surface treatment tool 441 of the welded surface treatment device 440 returns to the original position and stops rotating.

It is to be noted that the third upper frame jig transfer body 420 of the welded surface treatment unit 400 of the apparatus for manufacturing a reinforcement frame according to the present invention carries the frame jig 700 with the reinforcement frame 800 seated thereon for surface treatment and, as the fourth frame jig transfer tool 421 is driven, moves the frame jig 700 to the jig recovery unit 500 for the next process. On the other hand, the third lower frame jig transfer body 430 carries a number of frame jigs 700, which have been recovered separately from the reinforcement frame, and, as the fourth frame jig recovery tool 431 is driven, moves the frame jigs 700 to the frame introduction unit 100 to reuse them.

FIG. 15 is a front view of a jig recovery unit of an apparatus for manufacturing a reinforcement frame for a display panel according to the present invention, and FIG. 16 is a top view of a jig recovery unit of an apparatus for manufacturing a reinforcement frame for a display panel according to the present invention.

As shown, the jig recovery unit 500 of the apparatus for manufacturing a reinforcement frame according to the present invention includes a fifth support platform 510 installed on the floor adjacent to the fourth support platform 410 and provided with a movement space 511 extending through the center in the upward/downward direction, a second jig bearing panel 520 adapted to move in the movement space 511 in the upward/downward direction and provided with a fifth frame jig transfer tool 521 installed so that the frame jig 700 can move on the upper side, and a frame recovery device 530 installed vertically above the second jig bearing panel 520.

Particularly, the frame recovery device 530 includes an extension frame 531 extending upward from one side of the fifth support platform 510 while being fixed to the side, a beam-shaped recovery device frame 532 coupled to the extension frame 531 and installed vertically above the second jig bearing panel in the horizontal direction, and a working arm assembly 533 adapted to slide along the recovery device frame. The working arm assembly 533 has a working arm 534 operatively coupled thereto and adapted to move vertically to grasp/release a welded reinforcement frame 800.

Upon sensing the transfer of a reinforcement frame 800 after welding and surface treatment, the working arm 534 descends and grasps the reinforcement frame 800. The work arm 534 lifts the reinforcement frame 800 and moves horizontally along the recovery device frame 532 so that the frame 800 is transferred to the frame transfer unit 600 for the next process. Then, the work arm 534 descends again and releases the reinforcement frame 800 to put it on the frame transfer body 620 of the frame transfer unit 600. As a result, the completed reinforcement frame 800 is transferred in front of a separate stacking/storage place.

FIG. 17 is a front view of a frame transfer unit of an apparatus for manufacturing a reinforcement frame for a display panel according to the present invention, and FIG. 18 is a top view of a frame transfer unit of an apparatus for manufacturing a reinforcement frame for a display panel according to the present invention.

As shown, the frame transfer unit 600 of the apparatus for manufacturing a reinforcement frame according to the present invention includes a sixth support platform 610 installed on the floor G adjacent to the fifth support platform 510 and a frame transfer body 620 fixed to the sixth support platform 610 in the horizontal direction and installed so that the welded reinforcement frames 3' and 3" can move on the upper side. When a number of reinforcement frames 800 are successively supplied from the frame recovery unit 530 and placed on the frame transfer body 620, they are gradually transferred, and the following reinforcement frames 800 are successively placed on the vacant rear portion of the frame transfer body 620 and then transferred.

The invention claimed is:
1. An apparatus for manufacturing a reinforcement frame for a display panel by forcing a number of unitary frame members (3' and 3") made of extruded aluminum alloy against each other in a square shape on an upper surface of a planar frame jig (700) and welding abutting portions, the apparatus comprising:
a frame introduction unit (100) having a first support platform (110) installed on a floor and provided with a movement space (111) extending through a center vertically, and a first jig bearing panel (120) adapted to move within the movement space (111) in upward/downward directions and provided with a first frame jig transfer tool (121) installed so that the frame jig (700) can move on an upper side, the frame jig (700) being stacked on top of the first flame jig transfer tool (121);
a jig transfer unit (200) having a second support platform (210) installed on the floor adjacent to the first support platform (110) and first upper and lower frame jig transfer bodies (220 and 230) fixed to the second support platform (210) one above the other in parallel, the first upper and lower frame jig transfer bodies (220 and 230) having a second frame jig transfer tool (221) installed so that the frame jig (700) can move on an upper side and a second frame jig recovery tool (231) installed so that the frame jig (700) can be recovered, respectively;

a frame welding unit (300) having a third support platform (310) installed on the floor adjacent to the second support platform (210), second upper and lower frame jig transfer bodies (320 and 330) fixed to the third support platform (310) one above the other in parallel and positioned at an identical level as the first upper and lower first frame jig transfer bodies (220 and 230), respectively, and a frame welder (340) installed vertically above the second upper frame jig transfer body (320), the second upper and lower jig transfer bodies (320 and 330) having a third frame jig transfer tool (321) installed so that the frame jig (700) can move on an upper side and a third frame jig recovery tool (331) installed so that the frame jig (700) can be recovered, respectively;

a welded surface treatment unit (400) having a fourth support platform (410) installed on the floor adjacent to the third support platform (310), third upper and lower frame jig transfer bodies (420 and 430) fixed to the fourth support platform (410) one above the other in parallel and positioned at an identical level as the first upper and lower first frame jig transfer bodies (220 and 230), respectively, and a welded surface treatment device (440) installed vertically above the third upper frame jig transfer body (420), the third upper and lower jig transfer bodies (420 and 430) having a fourth frame jig transfer tool (421) installed so that the frame jig (700) can move on an upper side and a fourth frame jig recovery tool (431) installed so that the frame jig (700) can be recovered, respectively;

a jig recovery unit (500) having a fifth support platform (510) installed on the floor adjacent to the fourth support platform (410) and provided with a movement space (511) extending through a center vertically, a second jig bearing panel (520) adapted to move in the movement space (511) in upward/downward directions and provided with a fifth frame jig transfer tool (521) installed so that the frame jig (700) can move on an upper side, and a frame recovery device (530) installed vertically above the second jig bearing panel (520); and a frame transfer unit (600) having a sixth support platform (610) installed on the floor adjacent to the fifth support platform (510) and a frame transfer body (620) fixed to the sixth support platform (610) horizontally and installed so that welded reinforcement frames (3' and 3") can move on an upper side.

2. The apparatus as claimed in claim 1, wherein the frame welder (340) of the frame welding unit (300) comprises a welding head (341) adapted to ascend/descend vertically and provided with a bottom surface for welding abutting surfaces of the unitary reinforcement frames (3' and 3") when rotated by a motor (M1).

3. The apparatus as claimed in claim 1, wherein the frame welding unit (300) further comprises a number of limit switches (Sw) for sensing arrival of each frame jig (700) at a predetermined location.

4. The apparatus as claimed in claim 1, wherein the welded surface treatment device (440) of the welded surface treatment unit (400) comprises a surface treatment tool (441) adapted to ascend/descend vertically and provided with a bottom surface for removing fine protrusions from welded surfaces of the unitary reinforcement frames (3' and 3") when rotated by a motor (M2).

5. The apparatus as claimed in claim 1, wherein the welded surface treatment unit (400) further comprises a number of limit switches (Sw) for sensing arrival of each frame jig (700) at a predetermined location.

6. The apparatus as claimed in claim 1, wherein the frame recovery device (530) of the jig recovery unit (500) comprises an extension frame (531) extending upward from one side of the fifth support platform (510) while being fixed to the side, a beam-shaped recovery device frame (532) coupled to the extension frame (531) and installed vertically above the second jig bearing panel (520) horizontally, and a working arm assembly (533) adapted to slide along the recovery device frame (532).

7. The apparatus as claimed in claim 1, wherein the first frame jig transfer tool (121), the second frame jig transfer tool (221), the second frame jig recovery tool (231), the third frame jig transfer tool (321), the third frame jig recovery tool (331), the fourth frame jig transfer tool (421), the fourth frame jig recovery tool (431), the fifth frame jig transfer tool (521), and the frame transfer body (620) are rotation-driving rollers or conveyer belts, respectively.

8. A method for manufacturing a reinforcement frame for a display panel by using aluminum alloy extrusion members, the method comprising the steps of:
   extruding aluminum alloy billets (S10);
   heat-treating bar-type extrusion members (S20) for 1-20 hours at 150-210° C.;
   cutting heat-treated extrusion members to obtain long and short frame members (3' and 3") having different lengths (S30);
   press-working the long and short frame members (3' and 3"), respectively (S40);
   retaining each pair of long and short frame members (3' and 3") in a square frame (2') shape on a jig (S50);
   welding and coupling respective abutting portions of two long and short frame members (3' and 3") forced against each other at four corner portions of the retained square frame (2') by rotational friction welding (S60); and
   removing welding burrs created on the four corner portions of the square frame (2') (S70).

9. A method for manufacturing a reinforcement frame for a display panel by using aluminum alloy extrusion members, the method comprising the steps of:
   extruding aluminum alloy billets (S10);
   heat-treating bar-type extrusion members (S20);
   cutting heat-treated extrusion members to obtain long and short frame members (3' and 3") having different lengths (S30);
   press-working the long and short frame members (3' and 3"), respectively (S40);
   retaining each pair of long and short frame members (3' and 3") in a square frame (2') shape on a jig (S50);
   welding and coupling respective abutting portions of two long and short frame members (3' and 3") forced against each other at four corner portions of the retained square frame (2') by rotational friction welding (S60) conducted under welding conditions that a protrusion on a bottom surface of a welding head has a height corresponding to 70-90% of a thickness of the frame members and the welding head has a rotation speed of 50-5,000 rpm and a movement speed of 10-1,000 m/min.; and
   removing welding burrs created on the four corner portions of the square frame (2') (S70).

* * * * *